(12) United States Patent
Koponen et al.

(10) Patent No.: US 9,306,909 B2
(45) Date of Patent: Apr. 5, 2016

(54) CONNECTION IDENTIFIER ASSIGNMENT AND SOURCE NETWORK ADDRESS TRANSLATION

(71) Applicant: Nicira, Inc., Palo Alto, CA (US)

(72) Inventors: Teemu Koponen, San Francisco, CA (US); Ronghua Zhang, San Jose, CA (US); Pankaj Thakkar, Santa Clara, CA (US); Martin Casado, Portola Valley, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

(21) Appl. No.: 14/549,517

(22) Filed: Nov. 20, 2014

(65) Prior Publication Data

US 2015/0081861 A1    Mar. 19, 2015

Related U.S. Application Data

(62) Division of application No. 13/678,518, filed on Nov. 15, 2012, now Pat. No. 8,913,611.

(60) Provisional application No. 61/560,279, filed on Nov. 15, 2011.

(51) Int. Cl.
*H04L 29/06* (2006.01)
*G06F 9/455* (2006.01)
(Continued)

(52) U.S. Cl.
CPC ............ *H04L 63/0245* (2013.01); *G06F 9/455* (2013.01); *G06F 9/45533* (2013.01); *G06F 9/45558* (2013.01); *G06F 15/177* (2013.01); *H04L 12/2424* (2013.01); *H04L 41/0803* (2013.01); *H04L 41/0806* (2013.01); *H04L 41/0813* (2013.01); *H04L 41/0823* (2013.01); *H04L 41/0889* (2013.01); *H04L 41/0893* (2013.01); *H04L 45/74* (2013.01); *H04L 49/70* (2013.01); *H04L 61/2503* (2013.01); *H04L 61/256* (2013.01); *H04L 61/2517* (2013.01); *H04L 61/2521* (2013.01);
(Continued)

(58) Field of Classification Search
None
See application file for complete search history.

(56) References Cited

U.S. PATENT DOCUMENTS

| 5,504,921 A | 4/1996 | Dev et al. |
|---|---|---|
| 5,550,816 A | 8/1996 | Hardwick et al. |

(Continued)

FOREIGN PATENT DOCUMENTS

| AU | 2012340383 | 4/2014 |
|---|---|---|
| AU | 2012340387 | 4/2014 |

(Continued)

OTHER PUBLICATIONS

U.S. Appl. No. 14/595,195, filed Jan. 12, 2015, Zhang, Ronghua, et al.

(Continued)

*Primary Examiner* — Kwang B Yao
*Assistant Examiner* — Adam Duda
(74) *Attorney, Agent, or Firm* — Adeli LLP

(57) ABSTRACT

A controller of a network control system for configuring several middlebox instances is described. The middlebox instances implement a middlebox in a distributed manner in several hosts. The controller assigns a first set of identifiers to a first middlebox instance that associates an identifier in the first set with a first packet. The controller assigns a second set of identifiers to a second middlebox instance that associates an identifier in the second set with a second packet.

20 Claims, 14 Drawing Sheets

(51) Int. Cl.

| | | |
|---|---|---|
| *H04L 12/741* | (2013.01) | |
| *G06F 15/177* | (2006.01) | |
| *H04L 29/12* | (2006.01) | |
| *H04L 12/931* | (2013.01) | |
| *H04L 29/08* | (2006.01) | |
| *H04L 12/751* | (2013.01) | |
| *H04L 12/24* | (2006.01) | |
| *H04L 12/933* | (2013.01) | |

(52) U.S. Cl.
CPC ....... *H04L 63/0218* (2013.01); *H04L 67/1008* (2013.01); *G06F 2009/4557* (2013.01); *H04L 41/12* (2013.01); *H04L 45/02* (2013.01); *H04L 49/15* (2013.01)

(56) References Cited

U.S. PATENT DOCUMENTS

| | | | |
|---|---|---|---|
| 5,751,967 | A | 5/1998 | Raab et al. |
| 6,104,699 | A | 8/2000 | Holender et al. |
| 6,353,614 | B1 | 3/2002 | Borella et al. |
| 6,512,745 | B1 | 1/2003 | Abe et al. |
| 6,539,432 | B1 | 3/2003 | Taguchi et al. |
| 6,680,934 | B1 | 1/2004 | Cain |
| 6,785,843 | B1 | 8/2004 | McRae et al. |
| 6,880,089 | B1 | 4/2005 | Bommareddy et al. |
| 7,046,630 | B2 | 5/2006 | Abe et al. |
| 7,055,173 | B1 | 5/2006 | Chaganty et al. |
| 7,197,572 | B2 | 3/2007 | Matters et al. |
| 7,209,439 | B2 | 4/2007 | Rawlins et al. |
| 7,283,473 | B2 | 10/2007 | Arndt et al. |
| 7,342,916 | B2 | 3/2008 | Das et al. |
| 7,450,598 | B2 | 11/2008 | Chen et al. |
| 7,478,173 | B1 | 1/2009 | Delco |
| 7,512,744 | B2 | 3/2009 | Banga et al. |
| 7,555,002 | B2 | 6/2009 | Arndt et al. |
| 7,606,260 | B2 | 10/2009 | Oguchi et al. |
| 7,627,692 | B2 | 12/2009 | Pessi |
| 7,649,851 | B2 | 1/2010 | Takashige et al. |
| 7,706,266 | B2 | 4/2010 | Plamondon |
| 7,710,874 | B2 | 5/2010 | Balakrishnan et al. |
| 7,730,486 | B2 | 6/2010 | Herington |
| 7,742,398 | B1 | 6/2010 | Tene et al. |
| 7,764,599 | B2 | 7/2010 | Doi et al. |
| 7,792,987 | B1 | 9/2010 | Vohra et al. |
| 7,808,929 | B2 | 10/2010 | Wong et al. |
| 7,818,452 | B2 | 10/2010 | Matthews et al. |
| 7,826,482 | B1 | 11/2010 | Minei et al. |
| 7,839,847 | B2 | 11/2010 | Nadeau et al. |
| 7,856,549 | B2 | 12/2010 | Wheeler |
| 7,885,276 | B1 | 2/2011 | Lin |
| 7,925,850 | B1 | 4/2011 | Waldspurger et al. |
| 7,936,770 | B1 | 5/2011 | Frattura et al. |
| 7,937,438 | B1 | 5/2011 | Miller et al. |
| 7,948,986 | B1 | 5/2011 | Ghosh et al. |
| 7,953,865 | B1 | 5/2011 | Miller et al. |
| 7,991,859 | B1 | 8/2011 | Miller et al. |
| 7,995,483 | B1 | 8/2011 | Bayar et al. |
| 8,005,015 | B2 | 8/2011 | Belqasmi et al. |
| 8,027,354 | B1 | 9/2011 | Portolani et al. |
| 8,031,633 | B2 | 10/2011 | Bueno et al. |
| 8,046,456 | B1 | 10/2011 | Miller et al. |
| 8,054,832 | B1 | 11/2011 | Shukla et al. |
| 8,055,789 | B2 | 11/2011 | Richardson et al. |
| 8,060,875 | B1 | 11/2011 | Lambeth |
| 8,131,852 | B1 | 3/2012 | Miller et al. |
| 8,149,737 | B2 | 4/2012 | Metke et al. |
| 8,166,201 | B2 | 4/2012 | Richardson et al. |
| 8,199,750 | B1 | 6/2012 | Schultz et al. |
| 8,204,982 | B2 | 6/2012 | Casado et al. |
| 8,224,931 | B1 | 7/2012 | Brandwine et al. |
| 8,224,971 | B1 | 7/2012 | Miller et al. |
| 8,265,075 | B2 | 9/2012 | Pandey |
| 8,312,129 | B1 | 11/2012 | Miller et al. |
| 8,339,959 | B1 | 12/2012 | Moisand et al. |
| 8,339,994 | B2 | 12/2012 | Gnanasekaran et al. |
| 8,456,984 | B2 | 6/2013 | Ranganathan et al. |
| 8,463,904 | B2 | 6/2013 | Casado et al. |
| 8,468,548 | B2 | 6/2013 | Kulkarni et al. |
| 8,543,808 | B2 | 9/2013 | Ahmed |
| 8,571,031 | B2 | 10/2013 | Davies et al. |
| 8,611,351 | B2 | 12/2013 | Gooch et al. |
| 8,612,627 | B1 | 12/2013 | Brandwine et al. |
| 8,621,058 | B2 | 12/2013 | Eswaran et al. |
| 8,625,594 | B2 | 1/2014 | Safrai et al. |
| 8,644,188 | B1 | 2/2014 | Brandwine et al. |
| 8,650,618 | B2 | 2/2014 | Asati et al. |
| 8,705,527 | B1 | 4/2014 | Addepalli et al. |
| 8,743,885 | B2 | 6/2014 | Khan et al. |
| 8,762,501 | B2 | 6/2014 | Kempf et al. |
| 8,913,611 | B2 | 12/2014 | Koponen et al. |
| 8,966,024 | B2 | 2/2015 | Koponen et al. |
| 8,966,029 | B2 | 2/2015 | Zhang et al. |
| 8,966,035 | B2 | 2/2015 | Casado et al. |
| 9,015,823 | B2 | 4/2015 | Koponen et al. |
| 2002/0093952 | A1 | 7/2002 | Gonda |
| 2002/0161867 | A1 | 10/2002 | Cochran et al. |
| 2002/0194369 | A1 | 12/2002 | Rawlins et al. |
| 2003/0069972 | A1 | 4/2003 | Yoshimura et al. |
| 2003/0093481 | A1 | 5/2003 | Mitchell et al. |
| 2004/0049701 | A1 | 3/2004 | Le Pennec et al. |
| 2004/0054793 | A1 | 3/2004 | Coleman |
| 2004/0098505 | A1 | 5/2004 | Clemmensen |
| 2005/0018669 | A1 | 1/2005 | Arndt et al. |
| 2005/0021683 | A1 | 1/2005 | Newton et al. |
| 2005/0050377 | A1 | 3/2005 | Chan et al. |
| 2005/0083953 | A1 | 4/2005 | May |
| 2005/0132030 | A1 | 6/2005 | Hopen et al. |
| 2005/0249199 | A1 | 11/2005 | Albert et al. |
| 2006/0092976 | A1 | 5/2006 | Lakshman et al. |
| 2006/0221961 | A1 | 10/2006 | Basso et al. |
| 2007/0140128 | A1 | 6/2007 | Klinker et al. |
| 2007/0233838 | A1 | 10/2007 | Takamoto et al. |
| 2007/0266433 | A1 | 11/2007 | Moore |
| 2007/0283348 | A1 | 12/2007 | White |
| 2007/0286185 | A1 | 12/2007 | Eriksson et al. |
| 2008/0002579 | A1 | 1/2008 | Lindholm et al. |
| 2008/0005293 | A1 | 1/2008 | Bhargava et al. |
| 2008/0049621 | A1 | 2/2008 | McGuire et al. |
| 2008/0071900 | A1 | 3/2008 | Hecker et al. |
| 2008/0072305 | A1 | 3/2008 | Casado et al. |
| 2008/0163207 | A1 | 7/2008 | Reumann et al. |
| 2008/0186990 | A1 | 8/2008 | Abali et al. |
| 2008/0189769 | A1 | 8/2008 | Casado et al. |
| 2008/0196100 | A1 | 8/2008 | Madhavan et al. |
| 2008/0225853 | A1 | 9/2008 | Melman et al. |
| 2008/0240122 | A1 | 10/2008 | Richardson et al. |
| 2009/0031041 | A1 | 1/2009 | Clemmensen |
| 2009/0063750 | A1 | 3/2009 | Dow |
| 2009/0083445 | A1 | 3/2009 | Ganga |
| 2009/0092137 | A1 | 4/2009 | Haigh et al. |
| 2009/0122710 | A1 | 5/2009 | Bar-Tor et al. |
| 2009/0129271 | A1 | 5/2009 | Ramankutty et al. |
| 2009/0150527 | A1 | 6/2009 | Tripathi et al. |
| 2009/0161547 | A1 | 6/2009 | Riddle et al. |
| 2009/0240924 | A1 | 9/2009 | Yasaki et al. |
| 2009/0249470 | A1 | 10/2009 | Litvin et al. |
| 2009/0249473 | A1 | 10/2009 | Cohn |
| 2009/0292858 | A1 | 11/2009 | Lambeth et al. |
| 2009/0300210 | A1 | 12/2009 | Ferris |
| 2009/0303880 | A1 | 12/2009 | Maltz et al. |
| 2010/0046530 | A1 | 2/2010 | Hautakorpi et al. |
| 2010/0046531 | A1 | 2/2010 | Louati et al. |
| 2010/0115080 | A1 | 5/2010 | Kageyama |
| 2010/0115101 | A1 | 5/2010 | Lain et al. |
| 2010/0125667 | A1 | 5/2010 | Soundararajan |
| 2010/0131636 | A1 | 5/2010 | Suri et al. |
| 2010/0138830 | A1 | 6/2010 | Astete et al. |
| 2010/0153554 | A1 | 6/2010 | Anschutz et al. |
| 2010/0165877 | A1 | 7/2010 | Shukla et al. |
| 2010/0214949 | A1 | 8/2010 | Smith et al. |
| 2010/0254385 | A1 | 10/2010 | Sharma et al. |
| 2011/0022695 | A1 | 1/2011 | Dalal et al. |
| 2011/0075674 | A1 | 3/2011 | Li et al. |

(56) References Cited

U.S. PATENT DOCUMENTS

| | | |
|---|---|---|
| 2011/0085559 A1 | 4/2011 | Chung et al. |
| 2011/0225594 A1 | 9/2011 | Iyengar et al. |
| 2011/0261825 A1 | 10/2011 | Ichino |
| 2011/0299534 A1 | 12/2011 | Koganti et al. |
| 2011/0310899 A1 | 12/2011 | Alkhatib et al. |
| 2012/0014386 A1 | 1/2012 | Xiong et al. |
| 2012/0144014 A1 | 6/2012 | Natham et al. |
| 2012/0155266 A1 | 6/2012 | Patel et al. |
| 2012/0236734 A1 | 9/2012 | Sampath et al. |
| 2012/0246637 A1 | 9/2012 | Kreeger et al. |
| 2012/0281540 A1 | 11/2012 | Khan et al. |
| 2013/0073743 A1 | 3/2013 | Ramasamy et al. |
| 2013/0103834 A1 | 4/2013 | Dzerve et al. |
| 2013/0121209 A1 | 5/2013 | Padmanabhan et al. |
| 2013/0125120 A1 | 5/2013 | Zhang et al. |
| 2013/0132532 A1 | 5/2013 | Zhang et al. |
| 2013/0132533 A1 | 5/2013 | Padmanabhan et al. |
| 2013/0163427 A1 | 6/2013 | Beliveau et al. |
| 2013/0163475 A1 | 6/2013 | Beliveau et al. |
| 2013/0163594 A1 | 6/2013 | Sharma et al. |
| 2014/0016501 A1 | 1/2014 | Kamath et al. |
| 2014/0169375 A1 | 6/2014 | Khan et al. |
| 2014/0195666 A1 | 7/2014 | Dumitriu et al. |
| 2015/0098360 A1 | 4/2015 | Koponen et al. |

FOREIGN PATENT DOCUMENTS

| | | |
|---|---|---|
| EP | 1653688 | 5/2006 |
| EP | 2748713 | 7/2014 |
| EP | 2748714 | 7/2014 |
| EP | 2748716 | 7/2014 |
| EP | 2748717 | 7/2014 |
| EP | 2748750 | 7/2014 |
| EP | 2748978 | 7/2014 |
| JP | 2003-124976 | 4/2003 |
| JP | 2003-318949 | 11/2003 |
| WO | WO 99/18534 | 4/1999 |
| WO | WO 2005/112390 | 11/2005 |
| WO | WO 2008/095010 | 8/2008 |

OTHER PUBLICATIONS

U.S. Appl. No. 14/595,199, filed Jan. 12, 2015, Koponen, Teemu, et al.
U.S. Appl. No. 14/687,869, filed Apr. 15, 2015, Koponen, Teemu, et al.
Portions of prosecution history of U.S. Appl. No. 13/678,518, Sep. 2, 2014, Koponen, Teemu, et al.
Portions of prosecution history of U.S. Appl. No. 13/678,504, Dec. 19, 2014, Koponen, Teemu, et al.
Portions of prosecution history of U.S. Appl. No. 13/678,512, Mar. 10, 2015, Padmanabhan, Amar, et al.
Portions of prosecution history of U.S. Appl. No. 13/678,498, Jan. 23, 2015, Koponen, Teemu, et al.
Portions of prosecution history of U.S. Appl. No. 13/678,536, Mar. 18, 2015, Padmanabhan, Amar, et al.
Portions of prosecution history of U.S. Appl. No. 13/678,485, Jan. 23, 2015, Zhang, Ronghua, et al.
Portions of prosecution history of U.S. Appl. No. 13/678,520, May 11, 2015, Zhang, Ronghua, et al.
WO 2013/074842 with International Search Report, May 23, 2013, Nicira, Inc.
International Preliminary Report on Patentability of PCT/US2012/065359, May 30, 2014 (mailing date), Nicira, Inc.
Portions of prosecution history of of EP12849710.4, Jan. 12, 2015 (mailing date), Nicira, Inc.
WO 2013/074828 with International Search Report, May 23, 2013, Nicira, Inc.
International Preliminary Report on Patentability of PCT/US2012/065341, May 30, 2014 (mailing date), Nicira, Inc.
Portions of prosecution history of EP12849295.6, Mar. 24, 2015 (mailing date), Nicira, Inc.
WO 2013/074844 with International Search Report, May 23, 2013, Nicira, Inc.
International Preliminary Report on Patentability of PCT/US2012/065361, May 30, 2014 (mailing date), Nicira, Inc.
Portions of prosecution history of EP12849104.0, Jan. 30, 2015 (mailing date), Nicira, Inc.
WO 2013/074827 with International Search Report, May 23, 2013, Nicira, Inc.
International Preliminary Report on Patentability of PCT/US2012/065339, May 30, 2014 (mailing date), Nicira, Inc.
Portions of prosecution history of AU2012340383, Mar. 19, 2015 (mailing date), Nicira, Inc.
Portions of prosecution history of EP12850519.5, Jan. 12, 2015 (mailing date), Nicira, Inc.
WO 2013/074855 with International Search Report, May 23, 2013, Nicira, Inc.
International Preliminary Report on Patentability of PCT/US2012/065383, May 30, 2014 (mailing date), Nicira, Inc.
WO 2013/074831 with International Search Report, May 23, 2013, Nicira, Inc.
International Preliminary Report on Patentability of PCT/US2012/065345, May 30, 2014 (mailing date), Nicira, Inc.
Portions of prosecution history of AU2012340387, Mar. 17, 2015 (mailing date), Nicira, Inc.
Portions of prosecution history of EP12849015.8, Jan. 29, 2015 (mailing date), Nicira, Inc.
WO 2013/074847 with International Search Report, May 23, 2013, Nicira, Inc.
International Preliminary Report on Patentability of PCT/US2012/065364, May 30, 2014 (mailing date), Nicira, Inc.
Portions of prosecution history of EP12850665.6, Apr. 20, 2015 (mailing date), Nicira, Inc.
Andersen, David, et al., "Resilient Overlay Networks," Oct. 2001, 15 pages, 18th ACM Symp. on Operating Systems Principles (SOSP), Banff, Canada, ACM.
Anderson, Thomas, et al., "Overcoming the Internet Impasse through Virtualization," Apr. 2005, pp. 34-41, IEEE Computer Society.
Anhalt, Fabienne, et al., "Analysis and evaluation of a XEN based virtual router," Sep. 2008, pp. 1-60, Unite de recherché INRA Phone-Alpes, Montbonnot Saint-Ismier, France.
Author Unknown, "Cisco Nexis 1000V Series Switches," Jul. 29, 2010, 2 pages, Cisco Systems, Inc.
Author Unknown, "Cisco VN-Link: Virtual Machine-Aware Networking," Apr. 2009, 2 pages, Cisco Systems, Inc.
Author Unknown, "Cisco VN-Link: Virtualization-Aware Networking," Month Unknown, 2009, 10 pages, Cisco Systems, Inc.
Author Unknown, "Enabling Service Chaining on Cisco Nexus 1000V Series," Month Unknown, 2012, 25 pages, Cisco.
Author Unknown, "Intel 82599 10 Gigabit Ethernet Controller: Datasheet, Revision: 2.73," Dec. 2011, 930 pages, Intel Corporation.
Author Unknown, "Virtual Machine Device Queues," White Paper, Month Unknown, 2007, pp. 1-4, Intel Corporation.
Author Unknown, "VMware for Linux Networking Support," Nov. 17, 1999, pp. 1-5, VMWare, Inc.
Barham, Paul, et al., "Xen and the Art of Virtualization," Oct. 19-22, 2003, pp. 1-14, SOSP'03, Bolton Landing New York, USA.
Cai, Zheng, et al., "The Preliminary Design and Implementation of the Maestro Network Control Platform," Oct. 1, 2008, pp. 1-17, NSF.
Casado, Martin, et al. "Ethane: Taking Control of the Enterprise," SIGCOMM'07, Aug. 27-31, 2007, pp. 1-12, ACM, Kyoto, Japan.
Casado, Martin, et al., "Rethinking Packet Forwarding Hardware," Seventh ACM SIGCOMM' HotNets Workshop, Nov. 2008, pp. 1-6, ACM.
Casado, Martin, et al., "Sane: A Protection Architecture for Enterprise Networks," In proceedings of Usenix Security, Aug. 2006, pp. 1-15.
Casado, Martin, et al., "Scaling Out: Network Virtualization Revisited," Month Unknown, 2010, pp. 1-8.
Casado, Martin, et al., "Virtualizing the Network Forwarding Plane," Dec. 2010, pp. 1-6.
Congdon, Paul, "Virtual Ethernet Port Aggregator Standards body Discussion," Nov. 10, 2008, pp. 1-26, HP.
Das, Suarav, et al. "Simple Unified Control for Packet and Circuit Networks," Month Unknown, 2009, pp. 147-148, IEEE.

(56) References Cited

OTHER PUBLICATIONS

Das, Suarav, et al., "Unifying Packet and Circuit Switched Networks with OpenFlow," Dec. 7, 2009, 10 pages.
Davie, B., et al., "A Stateless Transport Tunneling Protocol for Network Virtualization (STT)," Mar. 5, 2012, pp. 1-19, Nicira Networks, Inc., available at http://tools.ietf.org/html/draft-davie-stt-01.
Davoli, Renzo, "VDE: Virtual Distributed Ethernet," TRIDENTCOM'05, Feb. 23-25, 2005, pp. 1-8, IEEE Computer Society.
Dixon, Colin, et al., "An End to the Middle," Proceedings of the 12th conference on Hot topics in operating systems Usenix Association, May 2009, pp. 1-5, Berkeley, CA, USA.
Dobrescu, Mihai, et al., "RouteBricks: Exploiting Parallelism to Scale Software Routers," SOSP'09, Proceedings of the ACM SIGOPS 22nd Symposium on Operating Systems Principles, Oct. 2009, pp. 1-17, ACM New York, NY.
Dumitriu, Dan Mihai, et al. (U.S. Appl. No. 61/514,990), filed Aug. 4, 2011.
Farrel, A., "A Path Computation Element (PCS)-Based Architecture," Aug. 2006, pp. 1-41, RFC 4655.
Fischer, Anna, "[Patch][RFC] net/bridge: add basic VEPA support," Jun. 2009, pp. 1-5, GMANE Org.
Foster, Nate, et al., "Frenetic: A Network Programming Language," ICFP'11, Sep. 19-21, 2011, 13 pages, Tokyo, Japan.
Garfinkel, Tal, et al., "A Virtual Machine Introspection Based Architecture for Intrusion Detection," In Proc. Network and Distributed Systems Security Symposium, Feb. 2003, pp. 1-16.
Greenberg, Albert, et al., "A Clean Slate 4D Approach to Network Control and Management," ACM SIGCOMM Computer Communication Review, Oct. 2005, 12 pages, vol. 35, No. 5.
Greenberg, Albert, et al., "VL2: A Scalable and Flexible Data Center Network," SIGCOMM'09, Aug. 17-21, 2009, pp. 51-62, ACM, Barcelona, Spain.
Greenhalgh, Adam, et al., "Flow Processing and The Rise of Commodity Network Hardware," ACM SIGCOMM Computer Communication Review, Apr. 2009, pp. 21-26, vol. 39, No. 2.
Gude, Natasha, et al., "NOX: Towards an Operating System for Networks," ACM SIGCOMM Computer communication Review, Jul. 2008, pp. 105-110, vol. 38, No. 3.
Guo, Chanxiong, et al., "BCube: A High Performance, Server-centric Network Architecture for Modular Data Centers," SIGCOMM'09, Aug. 17-21, 2009, pp. 1-12, ACM, Barcelona, Spain.
Hinrichs, Timothy L., et al., "Practical Declarative Network Management," WREN'09, Aug. 21, 2009, pp. 1-10, Barcelona, Spain.
Ioannidis, Sotiris, et al., "Implementing a Distributed Firewall," CCS'00, Month Unknown, 2000, pp. 1-10, ACM, Athens, Greece.
Joseph, Dilip, et al., "A Policy-aware Switching Layer for Date Centers," Jun. 24, 2008, 26 pages, Electrical Engineering and Computer Sciences, University of California, Berkeley, CA, USA.
Kamath, Daya, et. al., "Edge virtual Bridge Proposal, Version 0. Rev. 0.1," Apr. 23, 2010, pp. 1-72, IEEE.
Keller, Eric, et al., "The 'Platform as a Service' Model for Networking," Month Unknown, 2010, pp. 1-6.
Kent, S., "IP Encapsulating Security Payload (ESP)," Dec. 2005, pp. 1-44, The Internet Society.
Koponen, Teemu, et al., "Onix: A Distributed Control Platform for Large-scale Production Networks," In Proc. OSDI, Oct. 2010, pp. 1-14.
Lakshminarayanan, Karthik, et al., "Routing as a Service," Month Unknown, 2004, pp. 1-15, Berkeley, California.
Laurent, Ciavaglia, et al., "Autonomic network engineering for the self-managing Future Internet (AFI); Generic Autonomic Network Architecture (An Architectural Reference Model for Autonomic Networking, Cognitive Networking and Self-Management)," Apr. 2013, ETSI, France, Part 1 of 2, pp. 1-79.
Laurent, Ciavaglia, et al., "Autonomic network engineering for the self-managing Future Internet (AFI); Generic Autonomic Network Architecture (An Architectural Reference Model for Autonomic Networking, Cognitive Networking and Self-Management)," Apr. 2013, ETSI, France, Part 2 of 2, pp. 80-167.
Loo, Boon Thau, et al., "Declarative Routing: Extensible Routing with Declarative Queries," In Proc. of SIGCOMM, Aug. 21-26, 2005, 14 pages, Philadelphia, PA, USA.
Loo, Boon Thau, et al., "Implementing Declarative Overlays," In Proc. of SOSP, Oct. 2005, 16 pages, Brighton, UK.
Luo, Jianying, et al., "Prototyping Fast, Simple, Secure Switches for Ethane," Month Unknown, 2007, pp. 1-6.
McKeown, Nick, et al., "OpenFlow: Enabling Innovation in Campus Networks," ACS SIGCOMM Computer communication Review, Apr. 2008, pp. 69-74, vol. 38, No. 2.
Mogul, Jeffrey C., et al., "API Design Challenges for Open Router Platforms on Proprietary Hardware," Oct. 2008, pp. 1-6.
Popa, Lucian, et al., "Building Extensible Networks with Rule-Based Forwarding," in Usenix OSDI, Month Unknown, 2010, pp. 1-14.
Sekar, Vyas, et al., "Design and Implementation of a Consolidated Middlebox Architecture," In Proc. of NSDI, Month Unknown, 2012, 14 pages.
Shenker, Scott, et al., "The Future of Networking, and the Past of Protocols," Dec. 2, 2011, pp. 1-30, USA.
Sherry, Justine, et al., "Making Middleboxes Someone Else's Problem: Network Processing as a Cloud Service," In Proc. of SIGCOMM '12, Aug. 13-17, 2012, 12 pages, Helsinki, Finland.
Stiemerling, M., et al., "Middlebox Communication (MIDCOM) Protocol Semandtics," Mar. 2008, 70 pages, Internet Engineering Task Force.
Wang, Wei-Ming, et al., "Analysis and Implementation of an Open Programmable Router Based on Forwarding and Control Element Separation," Sep. 2008, pp. 769-779, Journal of Computer Science and Technology.
Yang, L., et al., "Forwarding and Control Element Separation (ForCES) Framework," Apr. 2004, pp. 1-40, The Internet Society.

CONNECTION IDENTIFIER ASSIGNMENT AND SOURCE NETWORK ADDRESS TRANSLATION

CLAIM OF BENEFIT TO PRIOR APPLICATIONS

This application is a divisional application of U.S. patent application Ser. No. 13/678,518, filed Nov. 15, 2012, now issued as U.S. Pat. No. 8,913,611. U.S. patent application Ser. No. 13/678,518 claims the benefit of U.S. Provisional Application 61/560,279, entitled "Virtual Middlebox Services", filed Nov. 15, 2011. U.S. patent application Ser. No. 13/678,518, now issued as U.S. Pat. No. 8,913,611, and U.S. Provisional Application 61/560,279 are incorporated herein by reference.

BACKGROUND

Many enterprises have large and sophisticated networks comprising switches, hubs, routers, middleboxes, servers, workstations and other networked devices, which support a variety of connections, applications and systems. The increased sophistication of computer networking, including virtual machine migration, dynamic workloads, multi-tenancy, and customer-specific quality of service and security configurations require a better paradigm for network control. Networks have traditionally been managed through low-level configuration of individual network components. Network configurations often depend on the underlying network: for example, blocking a user's access with an access control list ("ACL") entry requires knowing the user's current IP address. More complicated tasks require more extensive network knowledge: for example, forcing guest users' port 80 traffic to traverse an HTTP proxy requires knowing the current network topology and the location of each guest. This process is of increased difficulty where the network switching elements are shared across multiple users.

In response, there is a growing movement towards a new network control paradigm called Software-Defined Networking (SDN). In the SDN paradigm, a network controller, running on one or more servers in a network, controls, maintains, and implements control logic that governs the forwarding behavior of shared network switching elements on a per user basis. Making network management decisions often requires knowledge of the network state. To facilitate management decision-making, the network controller creates and maintains a view of the network state and provides an application programming interface upon which management applications may access a view of the network state.

Some of the primary goals of maintaining large networks (including both datacenters and enterprise networks) are scalability, mobility, and multi-tenancy. Many approaches taken to address one of these goals results in hampering at least one of the others. For instance, one can easily provide network mobility for virtual machines within an L2 domain, but L2 domains cannot scale to large sizes. Furthermore, retaining user isolation greatly complicates mobility. As such, improved solutions that can satisfy the scalability, mobility, and multi-tenancy goals are needed.

BRIEF SUMMARY

Some embodiments of the invention provide a network control system that allows a user to specify a logical network that includes one or more logical forwarding elements (e.g., logical switches, logical routers, etc.) and one or more middleboxes (e.g., firewalls, load balancers, network address translators, intrusion detection systems (IDS), wide area network (WAN) optimizers, etc.). The system implements the user-specified logical forwarding elements across numerous managed switching elements on numerous physical machines that also host virtual machines of the logical network. The system implements the user-specified middleboxes across the numerous physical machines. Typically, the system of some embodiments configures, in one physical machine, a managed switching element that implements at least part of the logical switching elements and a distributed middlebox instance that provides a middlebox service to the packets forwarded by the managed switching element.

In some embodiments, a managed switching element that receives a packet from a VM that is hosted in the same physical machine performs all or most of the logical forwarding processing of the logical forwarding elements on the received packet. Because the managed switching element receives the packet from the VM and performs forwarding processing on the packet, the managed switching element is the first-hop managed switching element with respect to the packet. While the first-hop managed switching element is performing the logical forwarding of the packet, the first-hop managed switching element has the distributed middlebox instance that is running in the same host to process the packet according to the middlebox service that the distributed middlebox instance provides.

Since the distributed middlebox instances provide middlebox services to the packets forwarded by the managed switching elements that are running in the same hosts in which the distributed middlebox instances runs, possibly using the same algorithm or mechanism, packets processed by these distributed middlebox instances that are heading to the same destination may look identical from the viewpoint of the destination. For instance, packets sent out by virtual machines in different physical machines to establish connections with other virtual machines may be processed by the distributed middlebox instances hosted in the different physical machines. The distributed middlebox instances provide a source network address translation (SNAT) service to the packets (e.g., by translating the source network addresses of the packets into different network addresses to hide the real source network addresses). These packets then may have the same network address as the source network addresses of the packets. When these packets are heading to the same destination, these packets may be identical in terms of the five-tuples that the packets have (e.g., source and destination network addresses, source and destination port numbers, transport protocol type), even though these packets originate from different virtual machines. Consequently, the packets may appear to be packets of the same connection even though the packets should each be packets of their own connections.

The network control system of some embodiments configures the distributed middlebox instances in such a way that the distributed middlebox instances assign identifiers to the packets having the same five-tuple so that the connections established by the packets are distinguishable. Different embodiments assign the connection identifiers differently. For instance, in some embodiments, the system assigns a non-overlapping range of connection identifiers to each of the distributed middlebox instances that implement a middlebox. The distributed middlebox instances use identifiers within the range and the packets processed by these distributed middlebox instance can be uniquely identified by the identifier that is not used for other live connections. Alternatively or conjunctively, the network control system of some embodiments provides a set of application programming protocols (APIs) that each distributed middlebox instance can use to obtain and release a range of connection identifiers on demand. In these embodiments, the network control system maintains the available (i.e., not being used) and unavailable (i.e., being used) ranges of connection identifiers.

In some embodiments, the network control system lets each distributed middlebox maintain the entire available range of connection identifiers and assign connection identifiers to the packets forwarded by the managed switching element that are last-hop managed switching elements with respect to the packets. A managed switching element is a last-hop managed switching element with respect to a packet when the managed switching element forwards the packet to a destination virtual machine that runs in the same host in which the managed switching element runs.

The network control system of some embodiments implements a middlebox that provides a SNAT service in a distributed manner. The network control system receives, from a user, configuration data for configuring the middlebox, including SNAT rules to use to translate source addresses of incoming packets. The network control system configures the distributed middlebox instances that implement the middlebox to provide SNAT service in a similar way to how the network control system configures the managed switching elements to perform logical forwarding processing of the logical switching elements of the user.

In some embodiments, the network control system has several controllers including logical controllers and physical controllers. A logical controller is a master of logical switching elements of a user. A logical controller of some embodiments receives a specification of the logical switching elements from the user, in the form of logical control plane (LCP) data. A logical controller translates the LCP data into logical forwarding plane (LFP) data, which define control plane and forwarding plane of the logical switching elements. A logical controller then translates the LFP data to the universal physical control plane data. A logical controller then identifies a set of physical controllers, each of which is responsible for managing a managed switching element. A logical controller sends the universal control plane data only to the identified set of physical controllers that manages managed switching elements, each of which at least partially implements the logical switching elements of the user.

A physical controller translates the universal physical control plane data into customized physical control plane data, which is control plane data for the managed switching elements that implement the logical switching elements. The physical controller sends the customized physical control plane data to the managed switching element. The managed switching element then translates the customized control plane to perform the logical forwarding processing of the logical switching elements specified by the user.

Similarly, a logical controller receives configuration data for configuring the middlebox. The logical controller identifies the same set of physical controllers which are masters of the managed switching elements that implement, at least partially, the logical switching elements specified by the user. The logical controller sends the middlebox configuration data to the identified set of physical controllers. The physical controller of some embodiments then sends the middlebox configuration data to the managed switching elements so that the managed switching elements can send the middlebox configuration data to the distributed middlebox instances that run in the same host in which the managed switching elements run. Alternatively, the physical controller sends the middlebox configuration data directly to the distributed middlebox instance, which runs in the same host with the managed switching elements, of which the physical controller is the master.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1:
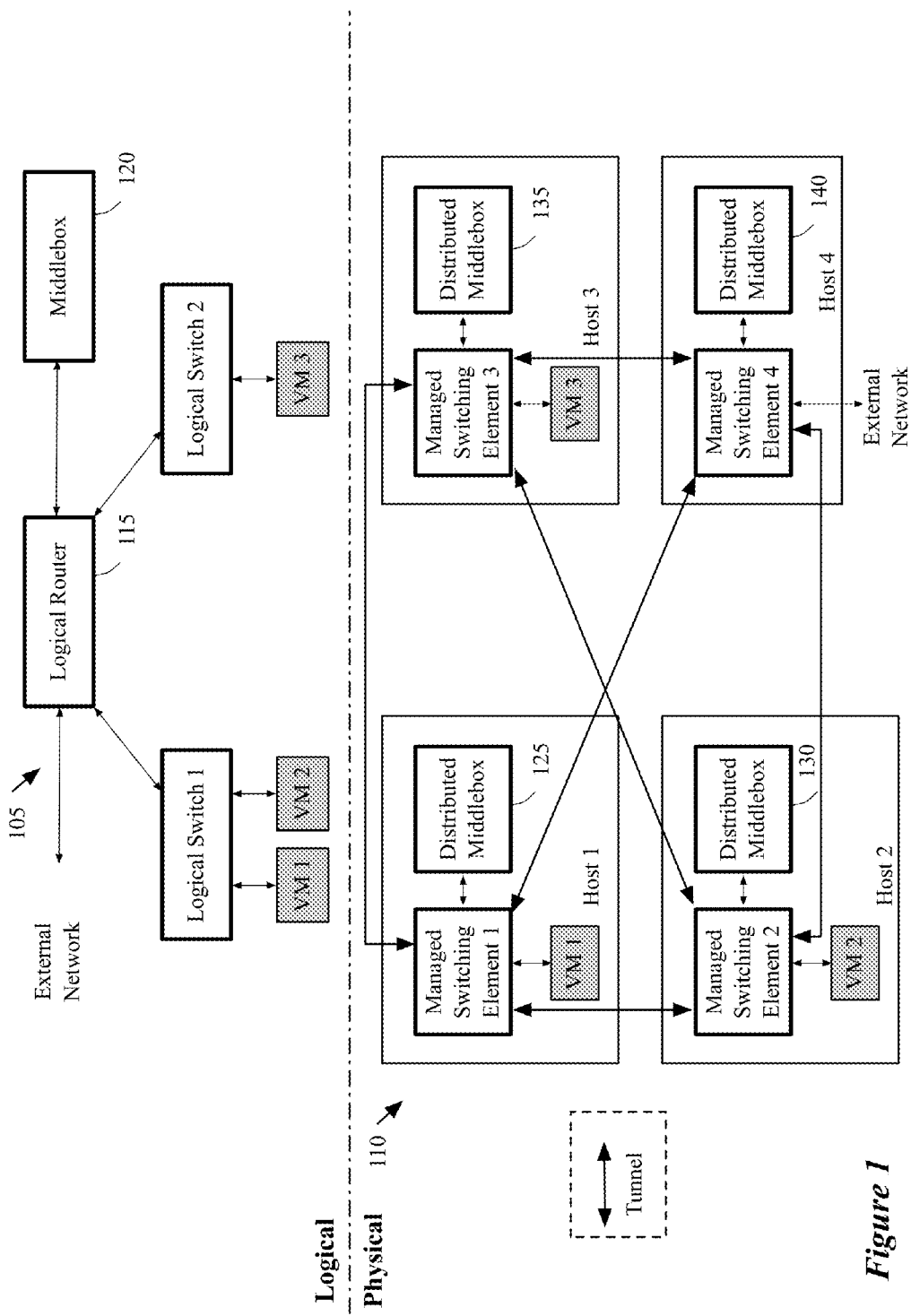
FIG. 1 illustrates an example network structure of a logical network of a user that is implemented in the infrastructure of a physical network.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a network control system that allows the logical datapath sets of different users to be implemented by switching elements of a physical network. These switching elements are referred to below as managed switching elements (MSEs) or managed forwarding elements as they are managed by the network control system in order to implement the logical datapath sets. Examples of such switching elements include virtual or physical network switches, software switches (e.g., Open vSwitch), routers, etc. In some embodiments, the logical datapath sets are implemented in the managed switching element in a manner that prevents the different users from viewing or controlling each other's logical datapath sets (i.e., each other's switching logic) while sharing the same switching elements.

To implement logical datapath sets, the network control system of some embodiments generates physical control plane data from logical datapath set data specified by the users. The physical control plane data is then downloaded to the MSEs. The MSEs convert the physical control plane data into physical forwarding plane data that allows the MSEs to perform forwarding of the packets that these MSEs receive. Based on the physical forwarding data, the MSEs can process data packets in accordance with the logical processing rules specified within the physical control plane data.

In some embodiments, each of the logical datapath sets defines a logical network that includes one or more logical switching elements. A logical switching element can process incoming packets in layer 2 (L2) or layer 3 (L3). That is, a logical switching element can function as a logical switch for switching packets at L2 and/or as a logical router for routing packets at L3. The network control system implements the logical switching elements of different users across the MSEs.

In addition to the logical switching elements, the network control system of some embodiments allows the users to specify middleboxes. As known in the art, middleboxes perform data processing other than forwarding the data (e.g., network address translation, load balance, firewall, intrusion detection and prevention, wide area network optimization, etc.). The middleboxes provide these middlebox services to the users' respective logical switching elements. The network control system implements the specified middleboxes in the physical infrastructure of the physical network, including the hosts in which the MSEs operate.

Several examples of such systems are described below in Section I. Section II then describes distributed middlebox instances that provide SNAT service. Section III describes an electronic system that implements some embodiments of the invention.

I. Implementing Logical Switching Elements And Middleboxes in a Distributed Manner A. Logical Switching Elements and Middleboxes FIG. 1 illustrates an example network structure of a logical network of a user that is implemented in the infrastructure of a physical network. Specifically, this figure illustrates that the logical network includes a middlebox and that the middlebox is implemented in the physical network in a distributed manner. The top half of the figure shows a logical network 105 while the bottom half of the figure shows a physical network 110 in which the logical network 105 is implemented.

As shown in the top half of the figure, the logical network 105 includes two logical switches 1 and 2, a logical router 115, and a middlebox 120. The logical switch 1 is connected to virtual machines (VMs) 1 and 2 and the logical router 115. There may be many other VMs connected to the logical switch 1 but they are not depicted in this figure for the simplicity of illustration and description. The logical switch 1 forwards data between VMs connected to the logical switch at L2 (e.g., by using MAC addresses) and between the VMs and the logical router 115 when the data needs routing at L3 (e.g., by using IP addresses). Like the logical switch 1, the logical switch 2 forwards data between the logical router 115 and the VMs connected to the logical switch 2.

The logical router 115 routes data at L3, among the logical switches connected to the logical router and the middlebox 120. When the data needs middlebox service (e.g., source network address translation), the logical router 115 sends the data to the middlebox 120 to process and in some cases receives the processed data back from the middlebox to route the data to the data's destination. The logical router 115 also routes data to and from the external network, which includes network elements that do not belong to the logical network 105.

As shown in the bottom half of FIG. 1, the physical network 110 includes hosts 1-4. A host is a machine that is managed by an operating system (e.g., Linux™, Windows™, etc.) that is capable of running software applications and virtual machines. Each of the hosts has several network elements running in the host, including several MSEs, several distributed middlebox instances, and/or several VMs. Not all of these network elements are depicted in each host in this figure for the simplicity of illustration and description. In some embodiments, a MSE is a software switching element that has components running in the user space and/or the kernel of the host on which the software is running Also, a distributed middlebox instance in some embodiments is a software application that has components running in the user space and/or the kernel. In some embodiments, a distributed middlebox instance is provisioned in a VM running in the host in which the MSE is running As shown, the host 1 includes MSE 1, a distributed middlebox instance 125, and VM 1. The host 2 includes MSE 2, a distributed middlebox instance 140, and VM 2. The host 3 includes MSE 3, a distributed middlebox instance 145, and VM 3. The host 4 includes MSE 4, and a distributed middlebox instance 140.

The MSEs 1-4 implement the logical switches 1 and 2 and the logical router 115 in a distributed manner. That is, the MSEs 1-4 of some embodiments collectively perform the data forwarding operations of the logical switches 1 and 2 and the logical router 115. Specifically, the ports (not shown) of the logical switches 1-2 are mapped to physical ports (e.g., virtual interfaces (VIFs)—not shown) of the MSEs 1-3. The VMs that send and receive data to and from the logical switches 1-2 through the ports of the logical switches actually send and receive the data to and from the MSEs through the physical ports of the MSEs to which the ports of the logical switches are mapped. The MSEs have forwarding tables (not shown) that include the physical forwarding plane data in the form of flow entries. In some embodiments, a flow entry includes a qualifier and an action. The qualifier specifies a condition which, when it is met, directs the MSE to perform the action. The MSEs perform the data forwarding operations of the logical switching elements (logical switches and logical routers) according to the actions specified in the flow entries. Forwarding tables and flow entries will be described further below by reference to FIG. 8.

The MSE that receives data from a VM is referred to as a first-hop MSE with respect to that data. In some embodiments, the first-hop MSEs performs all or most of the logical processing that are to be performed on the received data in order for the data to reach the data's destination. For instance, when the logical switch 1 receives a data packet from VM 1 that is addressed to VM 3, the logical switch 1 forwards the packet to the logical router 115. The logical router 115 then routes the packet to the logical switch 2, which will forward the packet to VM 3. In the physical network 110, the MSE 1 is the first-hop MSE with respect to this packet and performs logical processing to send the packet to VM 3, which is connected to the MSE 3. That is, the MSE 1 performs the forwarding operations of the logical switch 1, the logical router 115, and the logical switch 2 to send the packet from VM 1 to the VM 3. Likewise, for packets from VM 2 to VM 1 or VM 3, the MSE 2, as the first-hop MSE for these packets, performs the forwarding operations of the logical switch 1, the logical router 115, and the logical switch 2. The MSE 3 will also perform the forwarding operations of the logical switch 2, the logical router 115, and the logical switch 1 to send data packets from VM 3 to VM 1 or VM 2.

The MSEs exchange data amongst themselves via tunnels established between them. These tunnels allow the data to be exchanged among the MSEs over the other network elements (not shown) of the physical network 110. In some embodiments, the network control system does not manage these other network elements of the physical network 110. These other network elements thus serve as switching fabric for the MSEs to use to exchange data. As shown, each of the MSEs 1-4 establishes a tunnel to each of the other MSEs.

Different types of tunneling protocols are supported in different embodiments. Examples of tunneling protocols include control and provisioning of wireless access points (CAPWAP), generic route encapsulation (GRE), GRE Internet Protocol Security (IPsec), among others.

In some embodiments, the MSEs 1-4 are edge switching elements because these MSEs are considered to be at the 'edge' of the physical network 110. Being at the edge of the network means either (1) the MSEs directly interface with virtual machines to send and receive data to and from the virtual machines or (2) the MSEs connect the physical network 110 to another physical network which may or may not be managed by the network control system. As shown, the MSEs 1-3 directly interface with VMs 1-3, respectively. The MSE 4 interfaces the external network and functions as an integration element to facilitate data exchange between the network elements of the physical network 110 and the external network. The non-edge MSEs (not shown) may facilitate data exchange between the MSEs and/or other unmanaged switching elements (not shown) of the physical network 110.

The middlebox 120 in the logical network 105 is implemented in the physical network 110 in a distributed manner, too. In some embodiments, a distributed middlebox instance is running in the same host in which a MSE is running in order to provide the middlebox service to the packets forwarded by the MSE. For instance, the distributed middlebox instance 125 running in the host 1 provides the middlebox service to the packets forwarded by the MSE 1. That is, the distributed middlebox instance 125 receives data packets from the MSE 1 and performs middlebox operations (e.g., source NAT) to the packets. The distributed middlebox instance 125 then returns the packets back to the MSE 1 so that the packets are forwarded to the destinations of the packets. Likewise, the distributed middlebox instances 130 and 135 running in the hosts 2 and 3, respectively, next to the MSEs 2 and 3, respectively, provide the middlebox service to the packets coming to and from VMs 2 and 3, respectively. The distributed middlebox instance 140 running in the host 4 next to the MSE 4 provides the middlebox service for the packets forwarded by the MSE 4.

Figure 2:
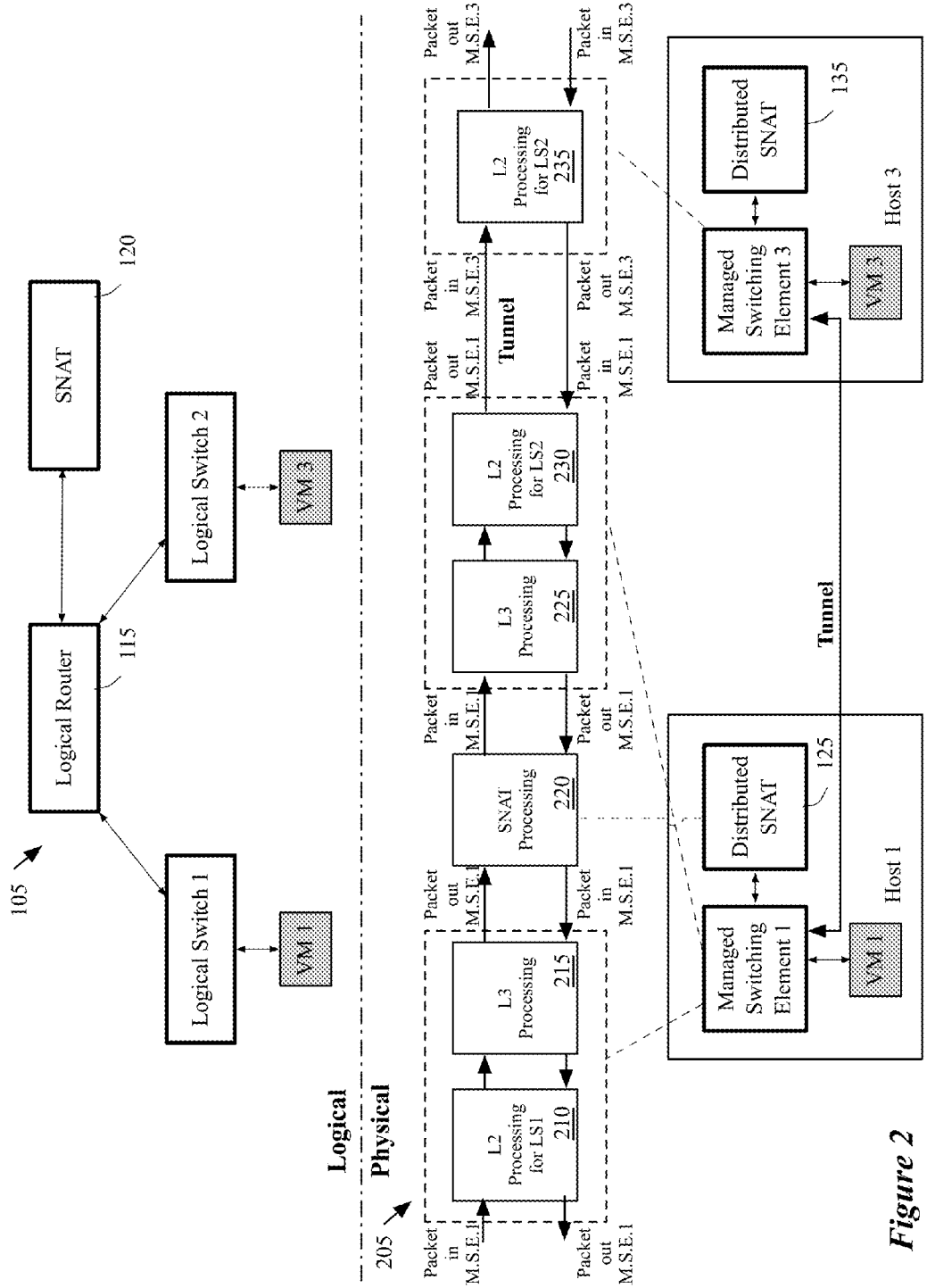
FIG. 2 illustrates a processing pipeline that is performed by the MSEs of some embodiments.

An example operation of the physical network 110 that implements the logical network 105 is now described by reference to FIG. 2. Specifically, FIG. 2 illustrates a processing pipeline 205 that is performed by the MSEs 1 and 3 and the distributed middlebox instance 125 in order to send a data packet from VM 1 to VM 3 via the distributed middlebox instance 125. FIG. 2 shows only VM 1 and VM 3, the logical switching elements, and hosts that are connected to or include VM 1 and VM 3 to illustrate data being sent from VM 1 to VM 3. The middlebox service that the middlebox 120 provides is SNAT in this example.

When VM 1 that is coupled to the logical switch 1 sends a packet (not shown) addressed to VM 3 that is coupled to the logical switch 2, the packet is first sent to the MSE 1. The MSE 1 then performs processing 210. The L2 processing 210 is a set of operations that define the logical switch 1's forwarding processing on the packet. By performing the L2 processing 210, the MSE 1 forwards the packet from VM 1 to the logical router 115. The packet is forwarded to the logical router 115 because VM 3 is not coupled to the logical switch 1 and thus has to be routed by the logical router 115 to the logical switch 2 to which VM 3 is coupled.

The MSE 1 then performs the L3 processing 215. The L3 processing 215 is a set of operations that define the logical router 115's routing of the packet. The logical router 115 routes the packet to the middlebox 120 to have the middlebox 120 change the packet source address (e.g., source IP address) to another address. By performing the L3 processing 215, the MSE 1 sends the packet to the distributed middlebox instance 125.

The distributed middlebox instance 125 which implements the middlebox 120 then performs SNAT processing 220 on the packet. In some embodiments, the distributed middlebox instance 125 changes the received packet's source IP address (i.e., VM 1's IP address) to a different address. In other embodiments, the distributed middlebox instance 125 creates flow entries and installs in the forwarding table (not shown) of the MSE 1 so that when the distributed middlebox instance 125 sends a packet back to the MSE 1, this packet's source IP address is changed by the MSE 1 based on those flow entries installed by the distributed middlebox instance 125. Creating and installing flow entries will be described further below by reference to FIGS. 8 and 12.

The MSE 1 then receives the packet sent from the distributed middlebox instance 125 and performs L3 processing 225 and L2 processing 230 on this packet. This packet has the source IP address that is assigned by the distributed middlebox instance 125. The L3 processing 225 is a set of operations that define the logical router 115's routing of the packet. By performing the L3 processing 225, the MSE 1 routes the packet from the middlebox 125 to the logical switch 2.

The MSE 1 then performs L2 processing 230. The L2 processing 230 is a set of operations that define the logical switch 1's forwarding processing on the packet. By performing the L2 processing 230, the MSE 1 forwards the packet from logical router 115 to VM 3. However, because VM 3 is not physically coupled to the MSE 1, the MSE 1 has to identify a MSE to which VM 3 is coupled. The MSE 1 identifies the MSE 3 (e.g., through address learning process) and sends the packet to the MSE 3 over the tunnel established between the MSEs 1 and 3.

In some embodiments, the MSE 3 performs L2 processing 235, which defines a portion of the set of operations that define the logical switch 2's forwarding processing on the packet. For instance, the MSE 3 performs an egress access control list (ACL) processing on the packet before forwarding the packet to VM 3. In other embodiments, the MSE 1 does not perform the L2 processing 230 nor the L2 processing 215. That is, the MSE 3 will perform all L2 processing for the logical switch 2. When VM 3 sends a packet to VM 1 in response to receiving a packet from VM 1, the MSE 3, the distributed middlebox instance 125, and the MSE 1 perform the processing pipeline 205 in the reverse order. Because most or all of the logical processing was performed by the MSE 1 for the packet that went to VM 3 from VM 1, most or all of logical processing for the response packet from VM 3 to VM 1 is also performed in the MSE 1. By having the MSE 1 perform most or all of logical processing on the packets going both ways between VM 1 and VM 3, some embodiments avoid sharing state information (e.g., original and translated source IP addresses mapping) between the MSEs 1 and 3. More detailed example operations of the MSEs 1 and 3 will be described further below by reference to FIGS. 6-14.

B. Configuring MSEs and Middleboxes

As described above, the MSEs of some embodiments implement logical switches and logical routers based on flow entries supplied to the MSEs by the network control system. The network control system of some embodiments is a distributed control system that includes several controller instances that allow the system to accept logical datapath sets from users and to configure the MSEs to implement these logical datapath sets (i.e., datapath sets defining the logical switching elements of the users). The distributed control system also receives middlebox configuration data from the users and configures the distributed middlebox instances by sending the configuration data to the distributed middlebox instances. These controller instances of the distributed control system form a cluster and thus the network control system is referred to as a controller cluster.

Figure 3:
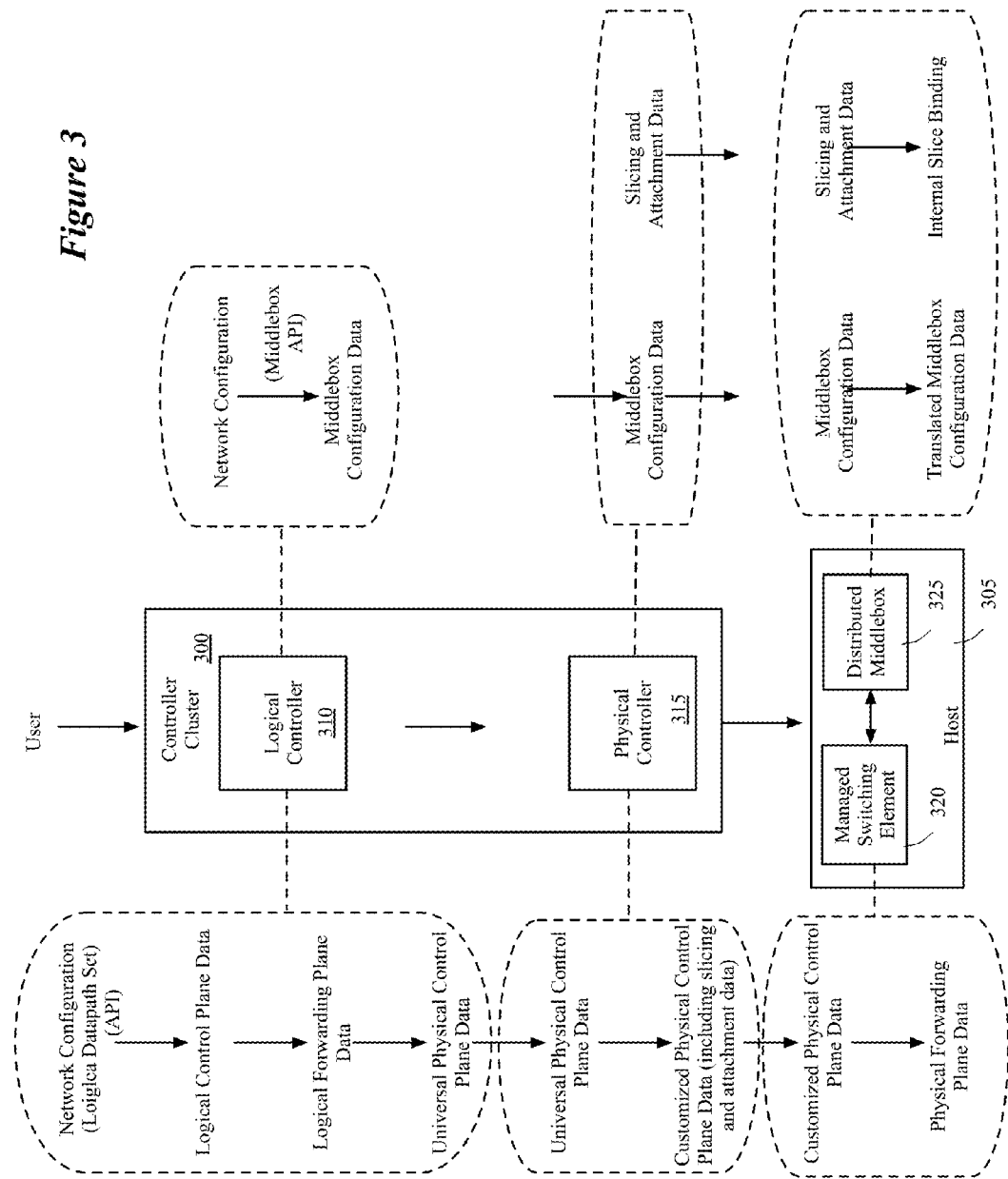
FIG. 3 illustrates an example controller cluster.

FIG. 3 illustrates an example controller cluster 300. The controller cluster 300 configures and manages several MSEs and several distributed middlebox instances running in several hosts. This figure illustrates only the controller cluster 300 and a host 305. The controller cluster 300 includes a logical controller 310 and a physical controller 315. The logical controller 310 and the physical controller 315 are two of many controllers (not shown) of the controller cluster 300.

In some embodiments, the logical controller 310 is a device (e.g., a general-purpose computer) that executes one or more modules that transform the user input from a LCP to a LFP, and then transform the LFP data to universal physical control plane data. These modules in some embodiments include a control module and a virtualization module (not shown). A control module allows a user to specify and populate a logical datapath set, while a virtualization module implements the specified logical datapath set by mapping the logical datapath set onto the physical switching infrastructure.

As shown on the left side of the logical controller 310, the logical controller 310 of some embodiments receives logical datapath set data from a user in a form of application protocol interface (API) calls that are supported by the logical controller 310. The API (not shown) of the logical controller 310 translates the logical datapath set data for configuring logical switches and logical routers into LCP data. The LCP data is the control plane data for the logical switching elements (e.g., logical switches and logical routers) that the user is managing through the controller cluster. The logical controller 310 generates LFP data from the LCP data. The LFP data is the forwarding plane data for the logical switching elements of the user. In some embodiments, the logical controller 310 has a set of modules (not shown) including a translation engine that translates the LCP data into the LFP data. In some such embodiments, the translation performed by the translation engine involves database table mapping.

From the LFP data for a particular logical datapath set of the user, the virtualization module of the logical controller 310 of some embodiments generates universal physical control plane (UPCP) data that is the control plane data for any MSE that implements the logical datapath set. The UPCP data does not include specifics of the MSEs (e.g., information that is local to the MSE such as a port number, etc.). In some embodiments, the translation engine translates the LFP data into UPCP data.

The set of modules of the logical controller 310 also includes a module that identifies a set of physical controllers that is responsible for controlling a set of MSEs that implement the logical datapath set (i.e., that implement the logical switching elements of the user). The logical controller 310 sends the UPCP data only to the identified set of physical controllers in some embodiments. The logical controller of different embodiments communicates with the physical controllers differently. For instance, in some embodiments, the logical controller 310 establishes a communication channel (e.g., a remote procedure call (RPC) channel) with each of the physical controllers in the identified set. Alternatively or conjunctively, the logical controller and the physical controller use a storage as a medium of communication by placing and pulling UPCP data in the storage.

The physical controller 315 is one of the physical controllers of the controller cluster 300. The physical controller 315 is responsible for managing the MSE 320. The physical controller 315 receives the UPCP data from the logical controller 310 and converts the UPCP data into customized physical control plane (CPCP) data for the MSE 320. In contrast to the UPCP data, the CPCP data for a MSE includes the specifics of the MSE. The CPCP data is the control plane data for the MSE. In some embodiments, the physical controller 315 has a set of modules (not shown) including a translation engine that translates the UPCP data into the CPCP data. In some such embodiment, the translation performed by the translation engine involves database table mapping.

The CPCP data includes the attachment data, which defines the coupling of the managed switching element and the distributed middlebox instance that implement the logical switching elements (the logical switches and the logical routers) of the user. For instance, the attachment data specifies the port number of a port of the MSE through which the MSE and the distributed middlebox instance exchange packets.

The physical controller 315 also sends slicing data to the MSE. Slicing data in some embodiments includes identifiers for identifying different "slices" of a distributed middlebox instance. In some embodiments, a distributed middlebox instance may provide a middlebox service to several different VMs that belong to several different users (i.e., several different logical domains). The distributed middlebox may be "sliced" so that each slice of the distributed middlebox instance provides the middlebox service one of these different VMs. When the managed switching element that forwards packets for the VMs sends packets to the distributed middlebox instance, the MSE uses the slice identifiers to indicate to which particular user or logical domain that a packet belongs so that the slice for the particular user processes the packet.

In some embodiments, the slicing data includes a binding between a long-form slice identifier and a short-form slice identifier. The long-form slice identifier is relatively long (e.g., 128 bit) and the short-form slice identifier is relatively short (e.g., 16 bit). In some embodiments, the long-term slice identifier is used to make an identity of a user unique across the numerous MSEs that might be implementing numerous users' logical domains. The short-form slice identifier is used for packet exchange between a MSE and a distributed middlebox instance running in a host.

The user also configures the middlebox service for the user's logical switching elements. As shown on the right side of the controller cluster 300, the logical controller 310 of some embodiments includes a middlebox API for taking API calls specifying the configuration of the middlebox service (e.g., SNAT rules) from the user. The middlebox API of the logical controller 310 extracts the configuration data from the middlebox API calls received from the user and sends the configuration data to the same set of physical controllers to which the logical controller 310 sends the UPCP data.

The physical controller 315 of some embodiments receives the configuration data from the logical controller 310 and then relays the configuration data to all MSEs, which the physical controller 315 manages, that implement at least part of the user's logical switching elements, including the MSE 320. The MSE 320 then sends this configuration data to the distributed middlebox instance 325. Alternatively or conjunctively, the physical controller 315 directly sends the middlebox configuration data to the distributed middlebox instance 325.

In some embodiments, the physical controller 315 also sends the slicing data and the attachment data to the distributed middlebox instances that the physical controller manages. The distributed middlebox instance 325 performs translation of the configuration data using the slicing and attachment data to complete the configuration of the distributed middlebox instance 325 as specified by the user. The distributed middlebox instance also creates a binding of slicing data. Specifically, the distributed middlebox instance of some embodiments creates a binding between short-form slice identifiers and internal slice identifiers to use only within the distributed middlebox instance 325. An example usage of the internal slice identifiers may be for populating a data structure that allows only certain lengths for the slice identifiers to have.

Each of the controllers illustrated in FIG. 3 is shown as a single controller. However, each of these controllers may actually be a controller cluster that operates in a distributed fashion to perform the processing of a logical controller or physical controller.

Figure 4:
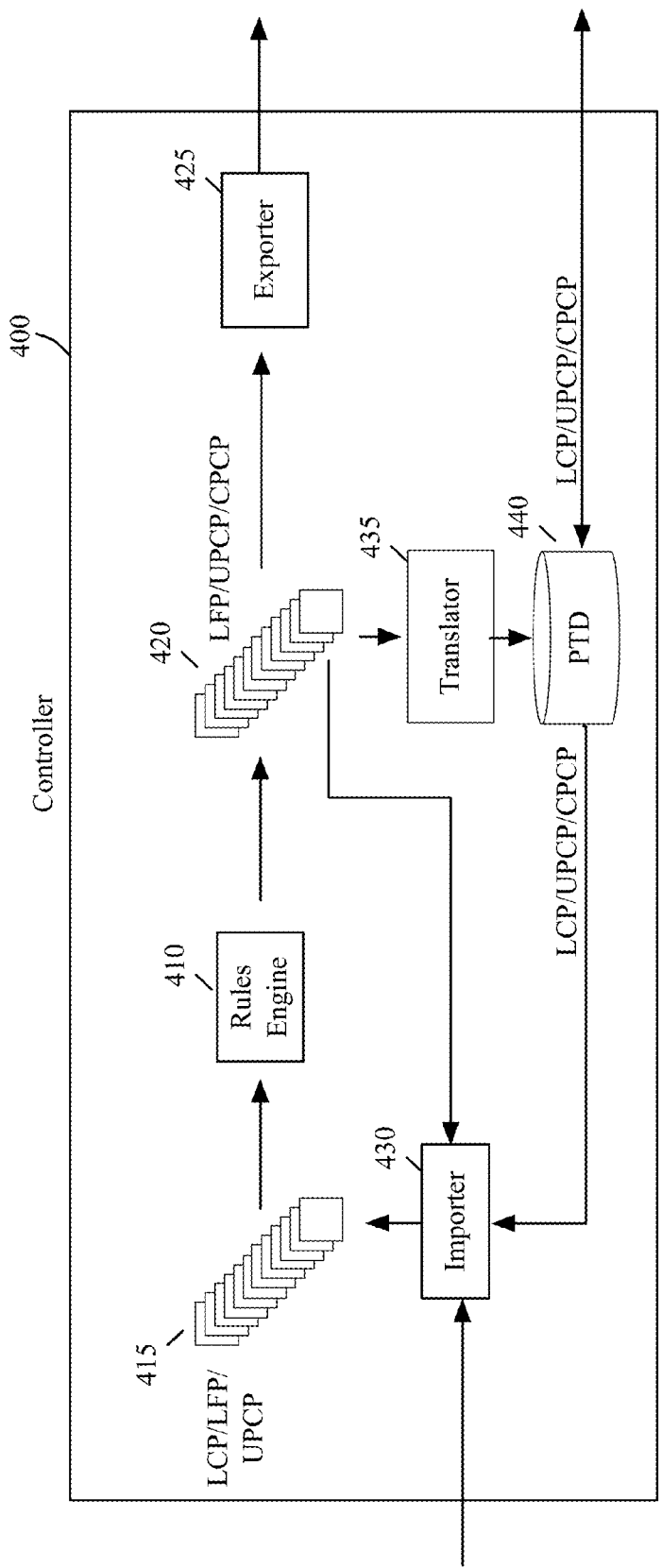
FIG. 4 illustrates example architecture of a network controller.

FIG. 4 illustrates example architecture of a network controller (e.g., a logical controller or a physical controller) 400. The network controller of some embodiments uses a table mapping engine to map data from an input set of tables to data in an output set of tables. The input set of tables in a controller includes LCP data to be mapped to LFP data, LFP data to be mapped to UPCP data, and/or UPCP data to be mapped to CPCP data. The input set of tables may also include middlebox configuration data to be sent to another controller and/or a distributed middlebox instance. The network controller 400, as shown, includes input tables 415, an rules engine 410, output tables 420, an importer 430, an exporter 435, a translator 435, and a persistent data storage (PTD) 440.

In some embodiments, the input tables 415 include tables with different types of data depending on the role of the controller 400 in the network control system. For instance, when the controller 400 functions as a logical controller for a user's logical forwarding elements, the input tables 415 include LCP data and LFP data for the logical forwarding elements. When the controller 400 functions as a physical controller, the input tables 415 include LFP data. The input tables 415 also include middlebox configuration data received from the user or another controller. The middlebox configuration data is associated with a logical datapath set parameter that identifies the logical switching elements to which the middlebox to be is integrated.

In addition to the input tables 415, the control application 400 includes other miscellaneous tables (not shown) that the rules engine 410 uses to gather inputs for its table mapping operations. These miscellaneous tables tables include constant tables that store defined values for constants that the rules engine 410 needs to perform its table mapping operations (e.g., the value 0, a dispatch port number for resubmits, etc.). The miscellaneous tables further include function tables that store functions that the rules engine 410 uses to calculate values to populate the output tables 425.

The rules engine 410 performs table mapping operations that specifies one manner for converting input data to output data. Whenever one of the input tables is modified (referred to as an input table event), the rules engine performs a set of table mapping operations that may result in the modification of one or more data tuples in one or more output tables.

In some embodiments, the rules engine 410 includes an event processor (not shown), several query plans (not shown), and a table processor (not shown). Each query plan is a set of rules that specifies a set of join operations that are to be performed upon the occurrence of an input table event. The event processor of the rules engine 410 detects the occurrence of each such event. In some embodiments, the event processor registers for callbacks with the input tables for notification of changes to the records in the input tables 415, and detects an input table event by receiving a notification from an input table when one of its records has changed.

In response to a detected input table event, the event processor (1) selects an appropriate query plan for the detected table event, and (2) directs the table processor to execute the query plan. To execute the query plan, the table processor, in some embodiments, performs the join operations specified by the query plan to produce one or more records that represent one or more sets of data values from one or more input and miscellaneous tables. The table processor of some embodiments then (1) performs a select operation to select a subset of the data values from the record(s) produced by the join operations, and (2) writes the selected subset of data values in one or more output tables 420.

Some embodiments use a variation of the datalog database language to allow application developers to create the rules engine for the controller, and thereby to specify the manner by which the controller maps logical datapath sets to the controlled physical switching infrastructure. This variation of the datalog database language is referred to herein as nLog. Like datalog, nLog provides a few declaratory rules and operators that allow a developer to specify different operations that are to be performed upon the occurrence of different events. In some embodiments, nLog provides a limited subset of the operators that are provided by datalog in order to increase the operational speed of nLog. For instance, in some embodiments, nLog only allows the AND operator to be used in any of the declaratory rules.

The declaratory rules and operations that are specified through nLog are then compiled into a much larger set of rules by an nLog compiler. In some embodiments, this compiler translates each rule that is meant to address an event into several sets of database join operations. Collectively the larger set of rules forms the table mapping rules engine that is referred to as the nLog engine.

Some embodiments designate the first join operation that is performed by the rules engine for an input event to be based on the logical datapath set parameter. This designation ensures that the rules engine's join operations fail and terminate immediately when the rules engine has started a set of join operations that relate to a logical datapath set (i.e., to a logical network) that is not managed by the controller.

Like the input tables 415, the output tables 420 include tables with different types of data depending on the role of the controller 400. When the controller 400 functions as a logical controller, the output tables 415 include LFP data and UPCP data for the logical switching elements. When the controller 400 functions as a physical controller, the output tables 420 include CPCP data. Like the input tables, the output tables 415 may also include the middlebox configuration data. Furthermore, the output tables 415 may include a slice identifier when the controller 400 functions as a physical controller.

In some embodiments, the output tables 420 can be grouped into several different categories. For instance, in some embodiments, the output tables 420 can be rules engine (RE) input tables and/or RE output tables. An output table is a RE input table when a change in the output table causes the rules engine to detect an input event that requires the execution of a query plan. An output table can also be an RE input table that generates an event that causes the rules engine to perform another query plan. An output table is a RE output table when a change in the output table causes the exporter 425 to export the change to another controller or a MSE. An output table can be an RE input table, a RE output table, or both an RE input table and a RE output table.

The exporter 425 detects changes to the RE output tables of the output tables 420. In some embodiments, the exporter registers for callbacks with the RE output tables for notification of changes to the records of the RE output tables. In such embodiments, the exporter 425 detects an output table event when it receives notification from a RE output table that one of its records has changed.

In response to a detected output table event, the exporter 425 takes each modified data tuple in the modified RE output tables and propagates this modified data tuple to one or more other controllers or to one or more MSEs. When sending the output table records to another controller, the exporter in some embodiments uses a single channel of communication (e.g., a RPC channel) to send the data contained in the records. When sending the RE output table records to MSEs, the exporter in some embodiments uses two channels. One channel is established using a switch control protocol (e.g., OpenFlow) for writing flow entries in the control plane of the MSE. The other channel is established using a database communication protocol (e.g., JSON) to send configuration data (e.g., port configuration, tunnel information).

In some embodiments, the controller 400 does not keep in the output tables 420 the data for logical datapath sets that the controller is not responsible for managing (i.e., for logical networks managed by other logical controllers). However, such data is translated by the translator 435 into a format that can be stored in the PTD 440 and is then stored in the PTD. The PTD 440 propagates this data to PTDs of one or more other controllers so that those other controllers that are responsible for managing the logical datapath sets can process the data.

In some embodiments, the controller also brings the data stored in the output tables 420 to the PTD for resiliency of the data. Therefore, in these embodiments, a PTD of a controller has all the configuration data for all logical datapath sets managed by the network control system. That is, each PTD contains the global view of the configuration of the logical networks of all users.

The importer 430 interfaces with a number of different sources of input data and uses the input data to modify or create the input tables 410. The importer 420 of some embodiments receives the input data from another controller. The importer 420 also interfaces with the PTD 440 so that data received through the PTD from other controller instances can be translated and used as input data to modify or create the input tables 410. Moreover, the importer 420 also detects changes with the RE input tables in the output tables 430.

C. Connection Identifiers Assignment

As described above by reference to FIGS. 1 and 2, the first-hop MSEs performs all or most of the logical processing that is to be performed on a data packet in order for the data packet to reach the data packet's destination. The packets from different VMs may be sent to the same VM. These packets are processed by logical switching elements and middleboxes implemented in multiple first-hop MSEs and distributed middlebox instances. The multiple first-hop MSEs and distributed middlebox instances may apply the same processing to these packets heading to the same destination. Thus, from the viewpoint of the destination MSE, the packets may not be distinguishable from one another.

For instance, a packet sent from VM 1 to VM 3 of FIG. 1 has a source IP address of VM 1 and the destination IP address of VM 3. When the distributed middlebox instance 125 applies a middlebox processing (e.g., SNAT) on this packet, the packet will have a source IP address assigned by the distributed middlebox instance 125 and the destination IP address of VM 3. Likewise, a packet sent from VM 2 to VM 3 of FIG. 1 initially has a source IP address of VM 2 and the destination IP address of VM 3. When the distributed middlebox instance 130 applies the same middlebox processing on this packet, this packet will have source IP address assigned by the distributed middlebox instance 130 and the destination IP address of VM 3. However, these two packets may have the same source IP address after being processed by the respective distributed middlebox instance because the middlebox processing performed on these two packets by the distributed middlebox instances are the same. Hence, from the viewpoint of the destination MSE attached to the destination of the packets (i.e., the MSE 3 for VM 3 of FIG. 1), these two packets from two different VMs have same field values. For instance, these two packets may have the same five-tuple (e.g., source IP address, source port number, destination IP address, destination port number, and protocol type).

In order for the destination MSE to forward response packets from the destination to the appropriate origins of the packets with the identical five-tuples, the destination MSE needs additional information to distinguish between those packets. In some embodiments, the MSEs assign and use connection identifiers to distinguish between those packets with the identical five-tuples from multiple different first-hop MSEs.

Figure 5:
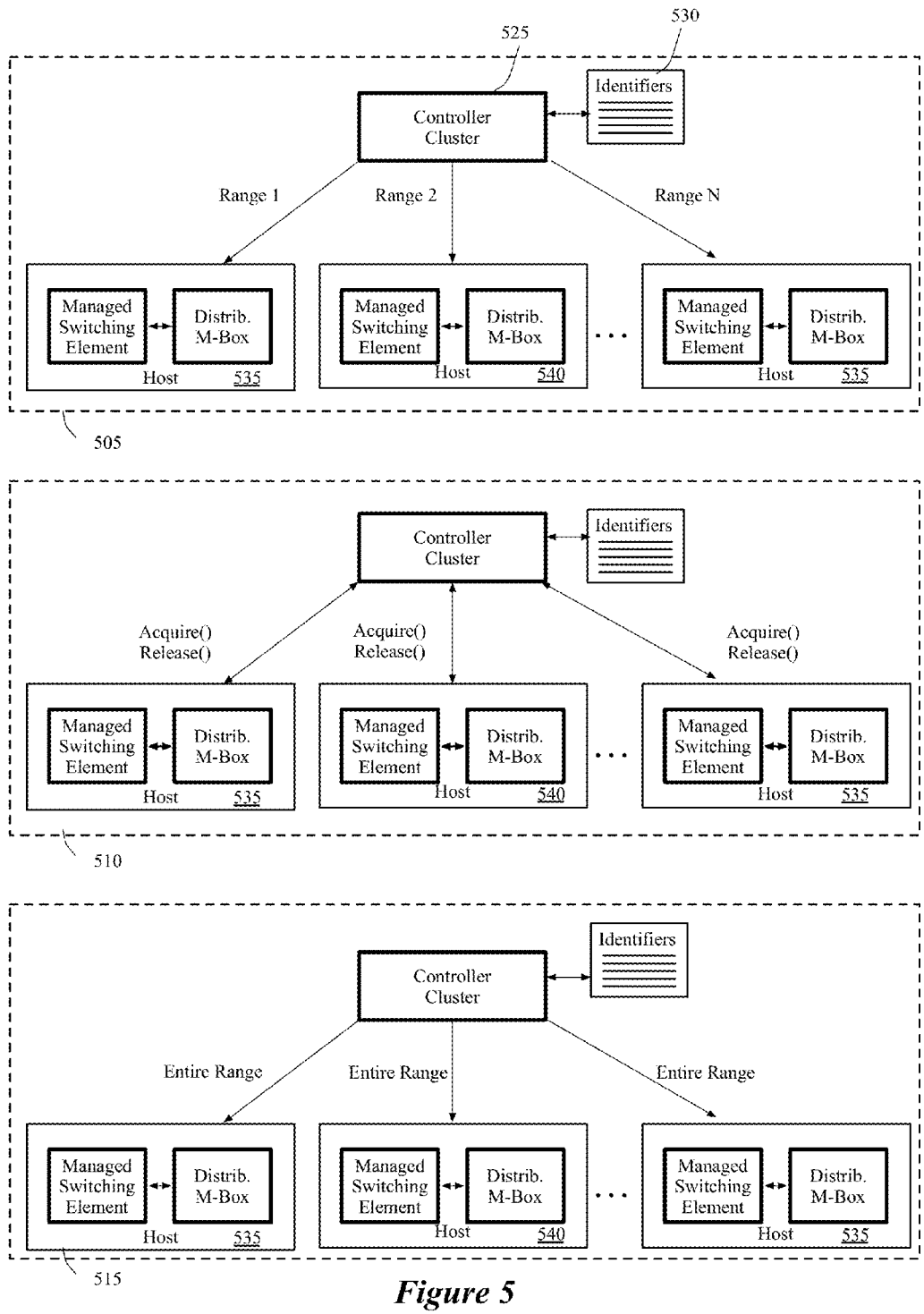
FIG. 5 conceptually illustrates several different ways of assigning connection identifiers to several distributed middlebox instances.

FIG. 5 conceptually illustrates several different ways of assigning connection identifiers to several distributed middlebox instances. Specifically, this figure illustrates three different approaches 505-515 of centrally assigning the connection identifiers to the distributed middlebox instances. This figure illustrates a controller cluster 525, an identifier space 530, and several hosts 535-545 for each of the three approaches. Each of the host includes a MSE and a distributed middlebox instance. The identifier space 530 includes a set of connection identifiers that can be assigned to the distributed middlebox instances.

The first approach 505 shows slicing the identifier space 530 in advance. That is, the controller cluster 525 assigns a non-overlapping range of connection identifiers to each distributed middlebox instance as the controller cluster configures the distributed middlebox instance. Each middlebox instance will have a pre-assigned range of identifiers and will assign an identifier from the range to a connection for which the corresponding MSE is a first-hop MSE. This approach can be taken when the number of connection identifiers is sufficient for the number of the distributed middlebox instances for which the identifiers should be sliced.

The second approach 510 shows slicing the identifier space 530 on demand. In this approach, a distributed middlebox instance asks for a range of connection identifiers from the controller cluster 525 whenever the distributed middlebox instance needs more connection identifiers. The distributed middlebox instance can release a range of connection identifiers when the distributed middlebox instance does not need the range of connection identifiers. The controller cluster 525 maintains the identifier space 530 to keep track of the ranges of identifiers that are being used by the distributed middlebox instances and the identifiers that are available to be assigned to the distributed middlebox instances. Specifically, the controller cluster 525 of some embodiments taking this approach supports a connection identifier assignment API that enables the distributed middlebox instances to obtain and release a range of connection identifiers on demand. An example API call for obtaining a range of connection identifiers is:

range_acquire (key, number of identifiers, purpose)

The key specifies the distributed middlebox instance that is asking for a range of identifiers. The number of identifiers is the number of identifiers that the distributed middlebox instance asking for. Purpose indicates whether this range of identifiers is going to be used for sanitizing the packets. Sanitizing packets will be described further below by reference to FIG. 12. The controller cluster 525 returns (1) a range of connection identifiers which includes the requested number of connection identifiers and (2) a range identifier for identifying the range.

An example API call for releasing a range of connection identifier is:

range_release (range_id)

The range_id is the range identifier for the range of connection identifiers to release. In response to receiving this API call, the controller cluster 525 makes this range of connection identifiers available for assigning to the distributed middlebox instances.

The third approach 515 shows assigning the entire range of connection identifiers to each of the distributed middlebox instances. This approach can be taken when the identifier assignment to a connection happens at the destination MSE for the connection, rather than at the first-hop MSE for the connection. Because the identifier assignment to the connection happens at the destination MSE, the identifier assignment is used only by the destination MSE and the corresponding middlebox instance. Therefore, there is no need to uniquely identify a connection across different MSEs.

II. Source Network Address Translation (SNAT)

As mentioned above, one of the middlebox services that a middlebox can provide is a SNAT service. When a middlebox is providing the SNAT service, the middlebox replaces the source network address (e.g., the source IP address) with a different source network address in order to hide the real source network address from the recipient of the packet. FIGS. 6-14 illustrate example operations of the MSEs 1-3 and the corresponding distributed middlebox instances 125-135. The distributed middlebox instances 125-135 provides SNAT service unless otherwise specified below.

Figure 6:
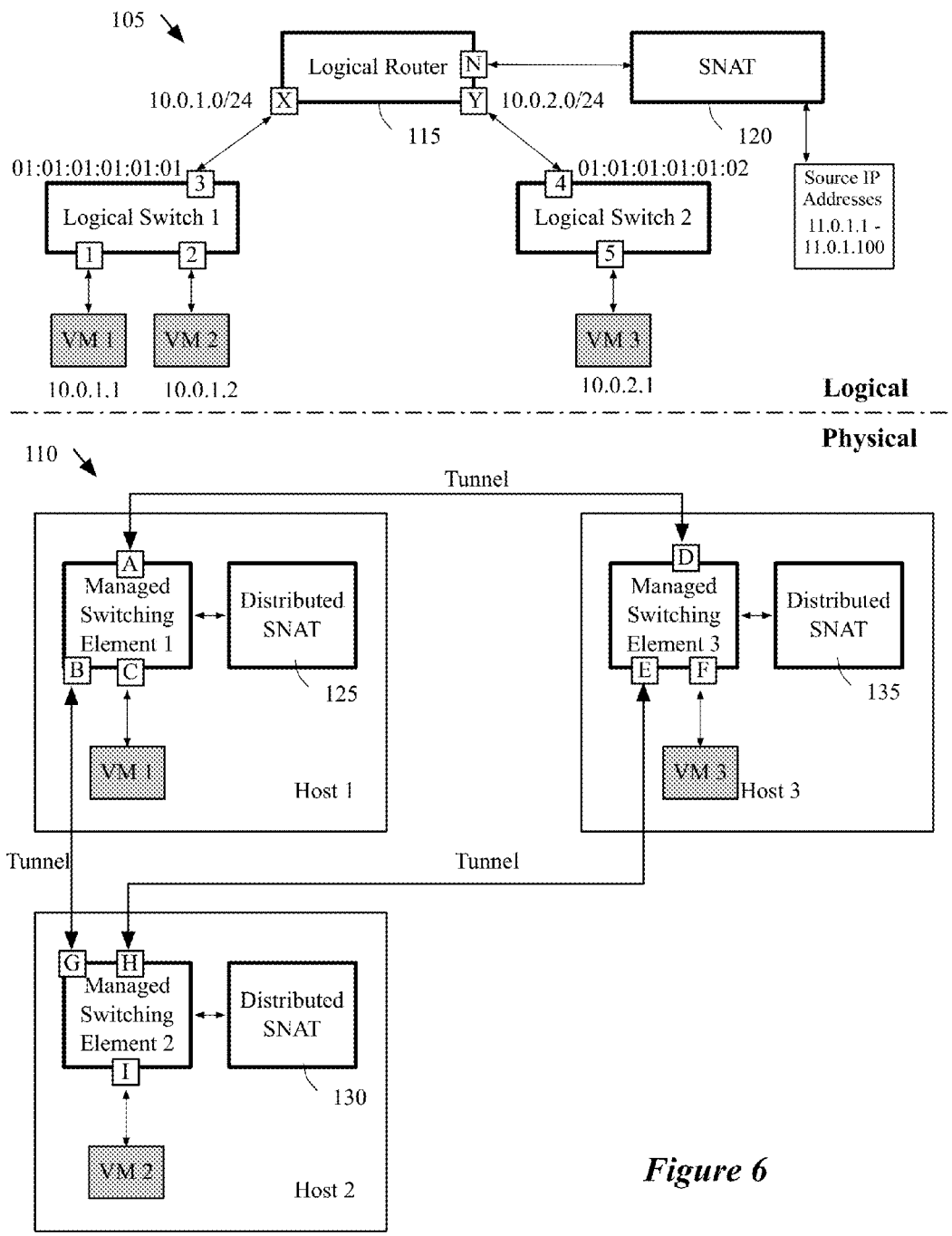
FIG. 6 illustrates a logical network and a physical network.

FIG. 6 illustrates the logical network 105 and the physical network 110 that is described above by reference to FIG. 1. Specifically, FIG. 6 illustrates the elements of the logical network 105 and the physical network 110 with ports. The description of these ports will be used in the description of the later figures, FIG. 7-14.

As shown, the logical switch 1 has three ports, ports 1-3. Port 1 is associated with VM 1's L2 address (e.g., a MAC address). Port 2 is associated with VM 2's L2 address. Port 3 is associated with the MAC address of port X of the logical router 115. The logical switch 2 has two ports, ports 4-5. Port 4 is associated with the MAC address of port Y of the logical router 115. In this example, the MAC address of port X is 01:01:01:01:01:01 and the MAC address of port Y is 01:01:01:01:01:02.

The logical router has ports X, Y, and N. Port X is coupled to port 3 of the logical switch 1. In this example, the logical switch 1 forwards packets between VMs that have IP addresses that belong to a subnet IP address of 10.0.1.0/24. Port X is therefore associated with a subnet IP address of 10.0.1.0/24. Port Y is coupled to port 4 of the logical switch 2. In this example, the logical switch 2 forwards packets between VMs that have IP addresses that belong to a subnet IP address of 10.0.2.0/24. Port Y is therefore associated with a subnet IP address of 10.0.2.0/24. Port N is for sending packets to the middlebox 120 and is not associated with any IP subnet in this example. In some embodiments, a port of the MSE that the MSE uses to communicate with the distributed middlebox instance (e.g., port N) is a port that does not have a physical port (e.g., VIF) to which the port is mapped. Also, VM 1 has an IP address of 10.0.1.1 and VM 2 has an IP address of 10.0.1.2. VM 3 has an IP address of 10.0.2.1 in this example. The middlebox 120 in this example has a set of IP addresses 11.0.1.1-11.0.1.100 to use to translate source IP addresses of packets that originate from the logical switch 1 (e.g., packets having the source IP addresses that belong to the subnet IP address of 10.0.1.0/24).

Shown in the bottom half of FIG. 6 are hosts 1-3 on which the MSEs 1-3 and the distributed middlebox instances 125-135, respectively, run. The MSE 1 has ports A-C. The MSE 2 has ports G-I. The MSE 3 has ports D-F. In this example, the tunnel that is established between the MSEs 1 and 2 terminates at ports B and G. The tunnel that is established between the MSEs 1 and 3 terminates at ports A and D. The tunnel that is established between the MSEs 2 and 3 terminates at ports H and E. Port C of the MSE 1 is mapped to port 1 of the logical switch 1 and therefore port C is associated with the MAC address of VM 1. Port 1 of the MSE 2 is mapped to port 2 of the logical switch 1 and therefore port 1 is associated with the MAC address of VM 2. Port F of the MSE 3 is mapped to port 5 of the logical switch 2 and therefore port F is associated with the MAC address of VM 3.

A. Distributed Middlebox Instance with SNAT Service

Figure 7:
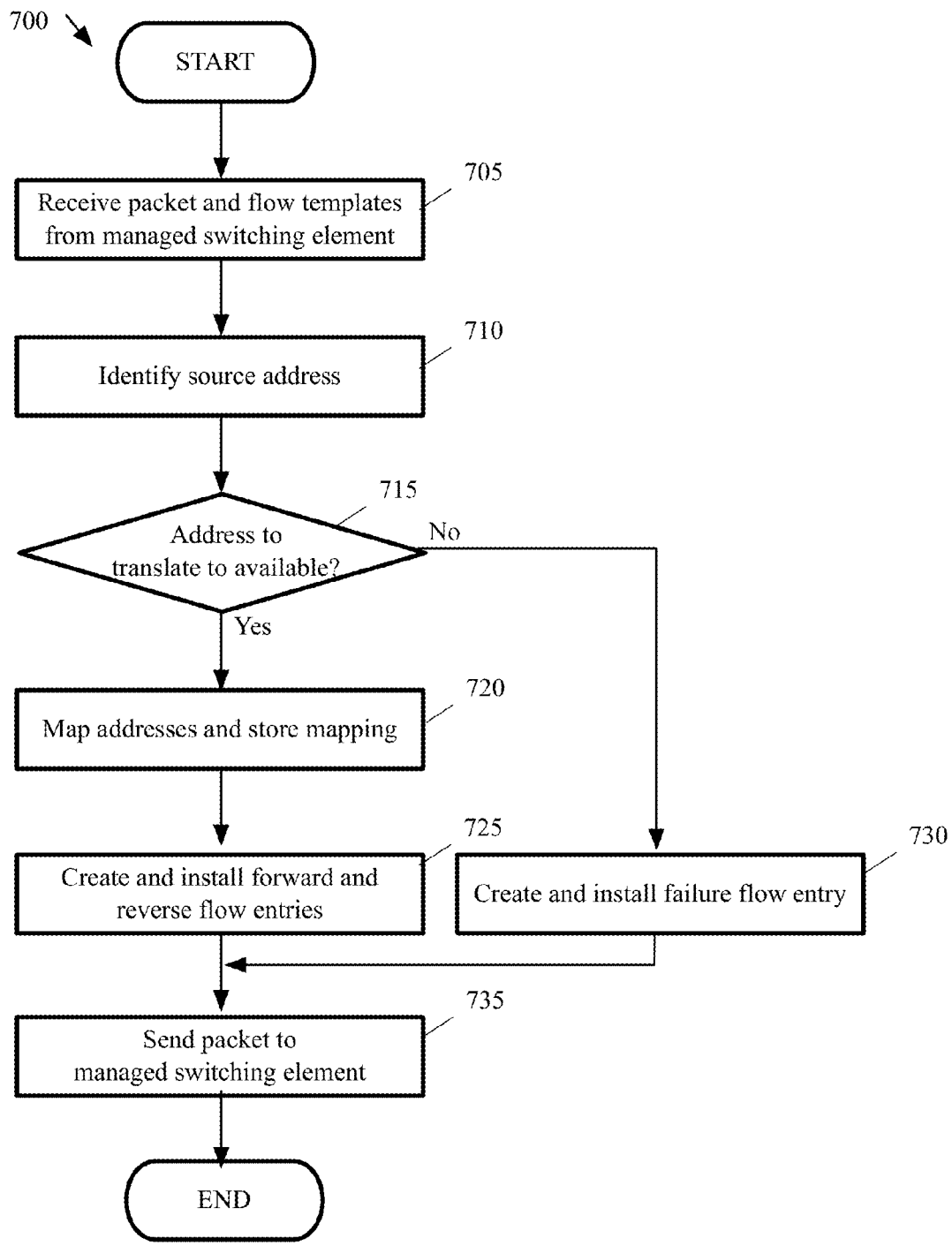
FIG. 7 conceptually illustrates a process that some embodiments perform to provide SNAT service.

FIG. 7 conceptually illustrates a process 700 that some embodiments perform to provide SNAT service. In some embodiments, the process 700 is performed by a distributed middlebox instance in order to translate source network addresses of the packets that the distributed middlebox instance's corresponding MSE (i.e., the MSE that is running in the same host), as a first-hop MSE, processes. The distributed middlebox instance of some embodiments receives flow templates along with the packets, which are flow entries that are missing some actual values. In these embodiments, the distributed middlebox provides the middlebox service by creating flow entries by filling in the flow templates with actual values and installing the created flow entries in the flow tables of the first-hop MSE. The distributed middlebox also sends the packets back to the first-hop MSE so that the packets are processed by the MSE based on the flow entries installed by the distributed middlebox instance.

The process 700 begins by receiving (at 705) a packet and several flow templates from a MSE that is a first-hop MSE with respect to this packet. That is, the MSE sending the packet has received the packet from a source VM with which the MSE directly interfaces. This packet's destination IP address is the IP address of a destination VM, which is not coupled to the logical switch to which the source VM is coupled. The packet has the IP address of the source VM as the source IP address.

Next, the process 700 identifies (at 710) the source IP address of the received packet so that the process can translate this address into another IP address. The process 700 then determines (at 715) whether there is an available IP address to which to translate the source IP address. In some embodiments, the process 700 maintains a set of IP addresses. When all IP addresses in the maintained set are used, the process 700 determines that no address is available. When there is an IP address in the maintained set of addresses that the process 700 can use, the process 700 determines that an address to which to translate the source IP address of the received packet is available.

When the process 700 determines (at 715) that there is no available address to which to translate the source IP address of the packet, the process 700 creates (at 730) and installs a failure flow entry. In some embodiments, the process 700 creates the failure flow entry by filling in a received (at 705) flow template with an instruction to drop the packet. The MSE will drop the packet according to the failure flow entry. The process 700 then proceeds to 735, which will be described further below.

When the process 700 determines (at 715) that there is an available address to which to translate the source IP address of the packet, the process 700 maps (at 720) the source IP address of the packet to the address to which to translate the source IP address and stores the mapping.

Next at 725, the process 700 creates and installs forward and reverse flow entries. A forward flow entry is a flow entry that directs the first-hop MSE to modify the packet by replacing the source IP address with the IP address to which the source IP address is mapped (at 720). In some embodiments, the process 700 creates the forward flow entry by filling in a received (at 705) flow template with the address to which the source IP address is mapped (at 720). A reverse flow entry is a flow entry that directs the first-hop MSE to modify a response packet that is sent from the destination of the initial packet (i.e., the packet that is sent to the destination) in response to receiving the initial packet. The response packet will have a destination IP address, which is the IP address to which the source IP address of the initial packet is translated. The first-hop MSE translates the destination IP address of the response packet so that the response packet can reach the source VM of the initial packet.

Next, the process 700 then sends (at 735) the packet back to the first-hop MSE. The process 700 then ends. The first-hop MSE will process the packet based on the flow entries, which will include the forward and reverse flow entries and/or the failure flow entry.

B. First-Hop Processing of the First Packet

Figure 8:
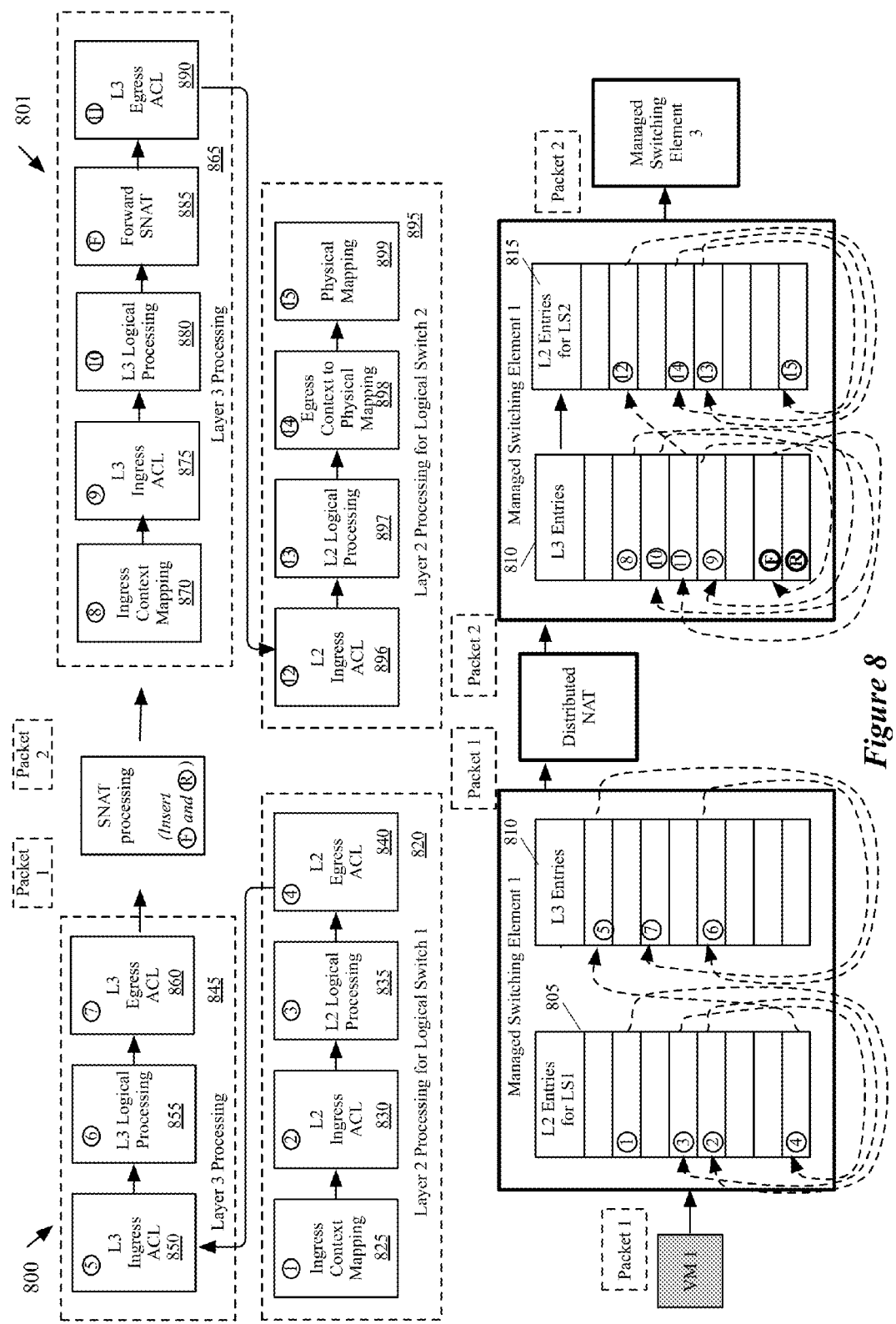
FIG. 8 conceptually illustrates an example operation of a MSE that is a first-hop MSE with respect to a data packet.

FIG. 8 conceptually illustrates an example operation of a MSE that is a first-hop MSE with respect to a data packet. Specifically, this figure illustrates an operation of the MSE 1 that processes a packet from VM 1 to VM 3. In this example, the packet is the very first packet that is sent from VM 1 to VM 3. This figure also illustrates the operation of a distributed middlebox instance that receives the packet from the first-hop MSE to provide SNAT service. Specifically, the top half of this figure illustrates two processing pipelines 800 and 801 that are performed by the MSE 1. The processing pipeline 800 includes L2 processing 820 for the logical switch 1 and L3 processing 845 for the logical router 115, which have stages 825-840 and stages 850-860, respectively. The processing pipeline 801 includes L3 processing 865 for the logical router 115 and L2 processing 895 for the logical switch 2, which have stages 870-890 and stages 896-899, respectively.

The bottom half of the figure illustrates the MSEs 1 and 3, and VM 1. As shown, the MSE 1 includes a table 805 for storing flow entries for the logical switch 1 (not shown), a table 810 for storing flow entries for the logical router 115, and a table 815 for storing flow entries for the logical switch 2. Although these tables are depicted as separate tables, the tables do not necessarily have to be separate tables. That is, a single table may include all the flow entries for the MSE 1 to use to perform the logical processing of the logical router 115 and the logical switches 1 and 2.

When VM 1 that is coupled to the logical switch 1 sends packet 1 to VM 3 that is coupled to the logical switch 2, the packet is first sent to the MSE 1 through port 1 of the MSE 1. The MSE 1 performs an L2 processing 820 on packet 1 based on the forwarding tables 805 of the MSE 1. In this example, packet 1 has a destination IP address of 10.0.2.1, which is the IP address of VM 3 as described above by reference to FIG. 6. Packet 1's source IP address is 10.0.1.1. Packet 1 also has VM 1's MAC address as a source MAC address and the MAC address of port X (01:01:01:01:01:01) of the logical router 115 as a destination MAC address.

The MSE 1 identifies a flow entry indicated by an encircled 1 (referred to as "record 1") in the forwarding table 805 that implements the context mapping of the stage 825. The record 1 identifies packet 1's logical context based on the ingress port, which is port 1 through which packet 1 is received from VM 1. In addition, the record 1 specifies that the MSE 1 stores the logical context of packet 1 in a set of fields (e.g., a VLAN id field) of packet 1's header. In some embodiments, a logical context represents the state of the packet with respect to the logical switching element. For example, some embodiments of the logical context may specify the logical switching element to which the packet belongs, the port of the logical switching element through which the packet was received, the port of the logical switching element through which the packet is to be transmitted, the stage of the LFP of the logical switching element the packet is at, etc.

The record 1 also specifies packet 1 is to be further processed by the forwarding tables (e.g., by sending packet 1 to a dispatch port). A dispatch port (not shown) is a port of a MSE to send the processed packet back to the ingress port of the MSE so that the MSE can further process the packet.

Based on the logical context and/or other fields stored in packet 1's header, the MSE 1 identifies a flow entry indicated by an encircled 2 (referred to as "record 2") in the forwarding tables that implements the ingress ACL of the stage 830. In this example, the record 2 allows packet 1 to be further processed and, thus, specifies packet 1 is to be further processed by the MSE 1. In addition, the record 2 specifies that the MSE 1 stores the logical context (i.e., packet 1 has been processed by the stage 830) of packet 1 in the set of fields of packet 1's header.

Next, the MSE 1 identifies, based on the logical context and/or other fields stored in packet 1's header, a flow entry indicated by an encircled 3 (referred to as "record 3") in the forwarding tables that implements the logical L2 forwarding of the stage 835. The record 3 specifies that a packet with the MAC address of port X of the logical router 115 as a destination MAC address is to be sent to port 3 of the logical switch 1.

The record 3 also specifies that packet 1 is to be further processed by the MSE 1. Also, the record 3 specifies that the MSE 1 stores the logical context (i.e., packet 1 has been processed by the third stage 835) in the set of fields of packet 1's header.

Next, the MSE 1 identifies, based on the logical context and/or other fields stored in packet 1's header, a flow entry indicated by an encircled 4 (referred to as "record 4") in the forwarding tables that implements the egress ACL of the stage 840. In this example, the record 4 allows packet 1 to be further processed (e.g., packet 1 can get out of the logical switch 1 through port 3 of the logical switch 1) and, thus, specifies packet 1 is to be further processed by the MSE 1 (e.g., by sending packet 1 to the dispatch port). In addition, the record 4 specifies that the MSE 1 stores the logical context (i.e., packet 1 has been processed by the stage 845 of the processing pipeline 800) of packet 1 in the set of fields of packet 1's header. (It is to be noted that all records specify that a MSE updates the logical context store in the set of fields whenever the MSE performs some portion of logical processing based on a record.)

The MSE 1 continues processing packet 1 based on the flow entries. The MSE 1 identifies, based on the logical context and/or other fields stored in packet 1's header, a flow entry indicated by an encircled 5 (referred to as "record 5") in the L3 entries 810 that implements L3 ingress ACL of the logical router 115 by specifying that the MSE 1 should accept the packet through port X of the logical router 115 based on the information in the header of packet 1. The record 5 also specifies that packet 1 is to be further processed by the MSE 1 (e.g., by sending packet 1 to a dispatch port). In addition, the record 5 specifies that the MSE 1 stores the logical context (i.e., packet 1 has been processed by the stage 850 of the processing pipeline 800) of packet 1 in the set of fields of packet 1's header.

The MSE 1 then identifies a flow entry indicated by an encircled 6 (referred to as "record 6") in the L3 entries table 810 implements the L3 routing 855 by specifying that a packet received through port X of the logical router 115 is to be sent to the middlebox 120 through port N. That is, the record 6 specifies that a packet having a source IP address that belongs to the subnet IP address of 10.0.1.0/24 is to be sent to the middlebox 120. Because packet 1 has the source IP address 10.0.1.1 that belongs to the subnet IP address of 10.0.1.0/24, the MSE 1 will send the packet to the distributed middlebox instance 125.

The MSE 1 then identifies a flow entry indicated by an encircled 7 (referred to as "record 7") in the L3 entries 810 that implements L3 egress ACL 860 by specifying that the MSE 1 allows the packet to exit out through port N of the logical router 115 based on the information (e.g., source IP address) in the header of packet 1. In addition, the record 7 specifies that the MSE 1 removes the logical context of packet 1 from the set of fields of packet 1's header. The MSE 1 sends packet 1 to the distributed middlebox instance 125, which implements the middlebox 120. The record 7 also specifies that several flow templates are to be sent to the middlebox 120 along with packet 1. The managed switching element 1 of some embodiments also sends a slice identifier to the distributed middlebox instance 125 so that the slice of the distributed middlebox instance 125 for the user of the logical switching elements in the logical network 1 processes packet 1.

Upon receiving packet 1, the distributed middlebox instance 125 identifies an IP address to which to translate the source IP address (10.0.1.1) of packet 1. In this example, the distributed middlebox instance 125 selects 11.0.1.1 from the range of IP addresses (11.0.1.1-11.0.1.100) described above by reference to FIG. 6. The distributed middlebox instance 125 also creates a forward flow entry that specifies that the MSE 1 modifies a packet that has a source IP address of 10.0.1.1 by replacing the source IP address (10.0.1.1) with the selected IP address (11.0.1.1). The distributed middlebox instance 125 also creates a reverse flow entry that specifies that the MSE 1 modifies a packet with a destination IP address of 11.0.1.1 by replacing the destination IP address of this packet with an IP address of the VM 1. The reverse flow entry ensures that a response packet from VM 3 reaches the correct destination, VM 1. The distributed middlebox instance 125 installs the created flow entries and sends packet 1 back to the MSE 1. In some embodiments, the MSE 1 treats the packet returned from the distributed middlebox instance 125 as a new packet to route. Thus, this new packet is referred to as packet 2 in this example. As shown, the forward and reverse flow entries are installed (e.g., placed) in the table 810 indicated by encircled F and R, respectively.

Upon receiving packet 2, the MSE 1 performs the L3 processing 865 on packet 2 based on the table 810. In this example, because packet 2 is still same as packet 1, packet 2 has a destination IP address of 10.0.2.1, which is the IP address of VM 3. Packet 2's source IP address is still 10.0.1.1. The MSE 1 identifies a flow entry indicated by an encircled 8 (referred to as "record 8") in the forwarding table 810 that implements the context mapping of the stage 870. The record 1 identifies packet 2's logical context based on the ingress port, which is port N through which packet 2 is received from the middlebox 120. In addition, the record 8 specifies that the MSE 1 stores the logical context of packet 2 in a set of fields (e.g., a VLAN id field) of packet 2's header. The record 8 also specifies packet 2 is to be further processed by the MSE 1 (e.g., by sending packet 2 to a dispatch port).

The MSE 1 continues processing packet 2 based on the flow entries. The MSE 1 identifies, based on the logical context and/or other fields stored in packet 2's header, a flow entry indicated by an encircled 9 (referred to as "record 9") in the L3 entries 810 that implements L3 ingress ACL 875 of the logical router 115 by specifying that the MSE 1 should accept the packet through port N of the logical router 115 based on the information in the header of packet 2. The record 9 also specifies that packet 2 is to be further processed by the MSE 1. In addition, the record 9 specifies that the MSE 1 stores the logical context (i.e., packet 2 has been processed by the stage 875 of the processing pipeline 801) of packet 2 in a set of fields of packet 2's header.

The MSE 1 then identifies a flow entry indicated by an encircled 10 (referred to as "record 10") in the L3 entries 810 that implements L3 routing 880 by specifying that packet 2 with its destination IP address (10.0.2.1) should exit out of port Y of the logical router 115. The record 10 also specifies that packet 2 is to be further processed by the MSE 1. In addition, the record 10 specifies that the MSE 1 stores the logical context (i.e., packet 2 has been processed by the stage 880 of the processing pipeline 801) of packet 2 in a set of fields of packet 2's header.

In some embodiments, the flow entries have associated priority levels. The priority levels are used to select one of several flow entries when a packet satisfies the conditions specified by the qualifiers of the several flow entries. The MSE 1 identifies a flow entry indicated by an encircled F (referred to as "record F") in the L3 entries table 810. The record F is the forward flow entry that the distributed middlebox instance has created and installed in the table 810. Packet 2 meets the condition specified in the record F as well as the condition specified in the record 6 because packet 2's source IP address is 10.0.1.1 that is specified as a condition in the record F and packet 2's source IP address belongs to the subnet IP address of 10.0.1.0/24 specified as a condition in the record 6. In some embodiments, the record F that is created by the distributed middlebox instance has a priority level that is higher than that of the record 6, which directs the MSE 1 to send the packet to the distributed middlebox instance 125. In addition, the record F specifies that the MSE 1 stores the logical context (i.e., packet 1 has been processed by the stage 885 of the processing pipeline 801) of packet 2 in the set of fields of packet 2's header. It is to be noted that the record F may be identified ahead of the record 10 so that the MSE 1 replaces the source IP address of the packet before routing the packet according to the record 10.

The MSE 1 then identifies a flow entry indicated by an encircled 11 (referred to as "record 11") in the L3 entries 810 that implements L3 egress ACL by specifying that the MSE 1 allows the packet to exit out through port Y of the logical router 115 based on the information (e.g., source IP address) in the header of packet 2. Also, the record 11 (or another record in the routing table, not shown) indicates that the source MAC address for packet 2 is to be rewritten to the MAC address of port Y of the logical router 115 (01:01:01: 01:01:02). Record 11 may also specify that the MSE 1 resolves the destination IP address of packet 2 in order to obtain the MAC address of VM 3. In some embodiments, the MSE 1 uses address resolution protocol (ARP) to resolve the destination IP address into the MAC address of the destination. Record 11 or another record may specify that the MSE 1 replaces the destination MAC address of the packet (currently the MAC address of port 3 of the MSE 1) with the MAC address of VM 3 to which the destination IP address has been resolved. In addition, the record 11 specifies that the MSE 1 stores the logical context (i.e., packet 2 has been processed by the stage 890 of the processing pipeline 801) of packet 2 in the set of fields of packet 2's header.

Packet 2 has exited the logical router 115 through port Y and has entered the logical switch 2 through port 4 of the logical switch 2. The MSE 1 then performs L2 processing 895. Based on the logical context and/or other fields stored in packet 2's header, the MSE 1 identifies a flow entry indicated by an encircled 12 (referred to as "record 12") in the L2 entries 815 that implements the ingress ACL of the stage 896. In this example, the record 12 specifies that packet 2 is to be further processed by the MSE 1. In addition, the record 12 specifies that the MSE 1 stores the logical context (i.e., packet 1 has been processed by the stage 896 of the processing pipeline 801) of packet 1 in the set of fields of packet 2's header.

Next, the MSE 1 identifies, based on the logical context and/or other fields stored in packet 1's header, a flow entry indicated by an encircled 13 (referred to as "record 13") in the L2 entries 815 that implements the logical L2 forwarding of the stage 897. The record 13 specifies that a packet with the MAC address of VM 3 as the destination MAC address should be forwarded through port 5 of the logical switch 2 that is connected to VM 3. The record 13 also specifies that packet 2 is to be further processed by the MSE 1. Also, the record 13 specifies that the MSE 1 stores the logical context (i.e., packet 2 has been processed by the stage 897 of the processing pipeline 801) in the set of fields of packet 2's header.

Based on the logical context and/or other fields stored in packet 2's header, the MSE 1 identifies a flow entry indicated by an encircled 14 (referred to as "record 14") in the L2 entries 815 that implements the context mapping of the stage 898. In this example, the record 14 identifies the MSE 3 as the MSE to which the packet exiting port 5 of the logical switch 2 should be sent. The record 14 additionally specifies that packet 2 be further processed by the MSE 1. In addition, the record 14 specifies that the MSE 1 stores the logical context (i.e., packet 2 has been processed by the stage 898 of the processing pipeline 801) of packet 2 in the set of fields of packet 2's header.

Based on the logical context and/or other fields stored in packet 2's header, the MSE 1 then identifies a flow entry indicated by an encircled 15 (referred to as "record 15") in the L2 entries 815 that implements the physical mapping of the stage 899. The record 15 specifies port A of the MSE 1 as a port through which packet 2 is to be sent in order for packet 2 to reach the MSE 3. In this case, the MSE 1 is to send packet 2 out of port A of MSE 1 that is coupled to the MSE 3 through a tunnel. In addition, the record 15 specifies that the MSE 1 stores the logical context (i.e., packet 2 has been processed by the stage 899 of the processing pipeline 801) of packet 2 in the set of fields of packet 2's header.

B. First-Hop Processing of the Subsequent Packets

Figure 9:
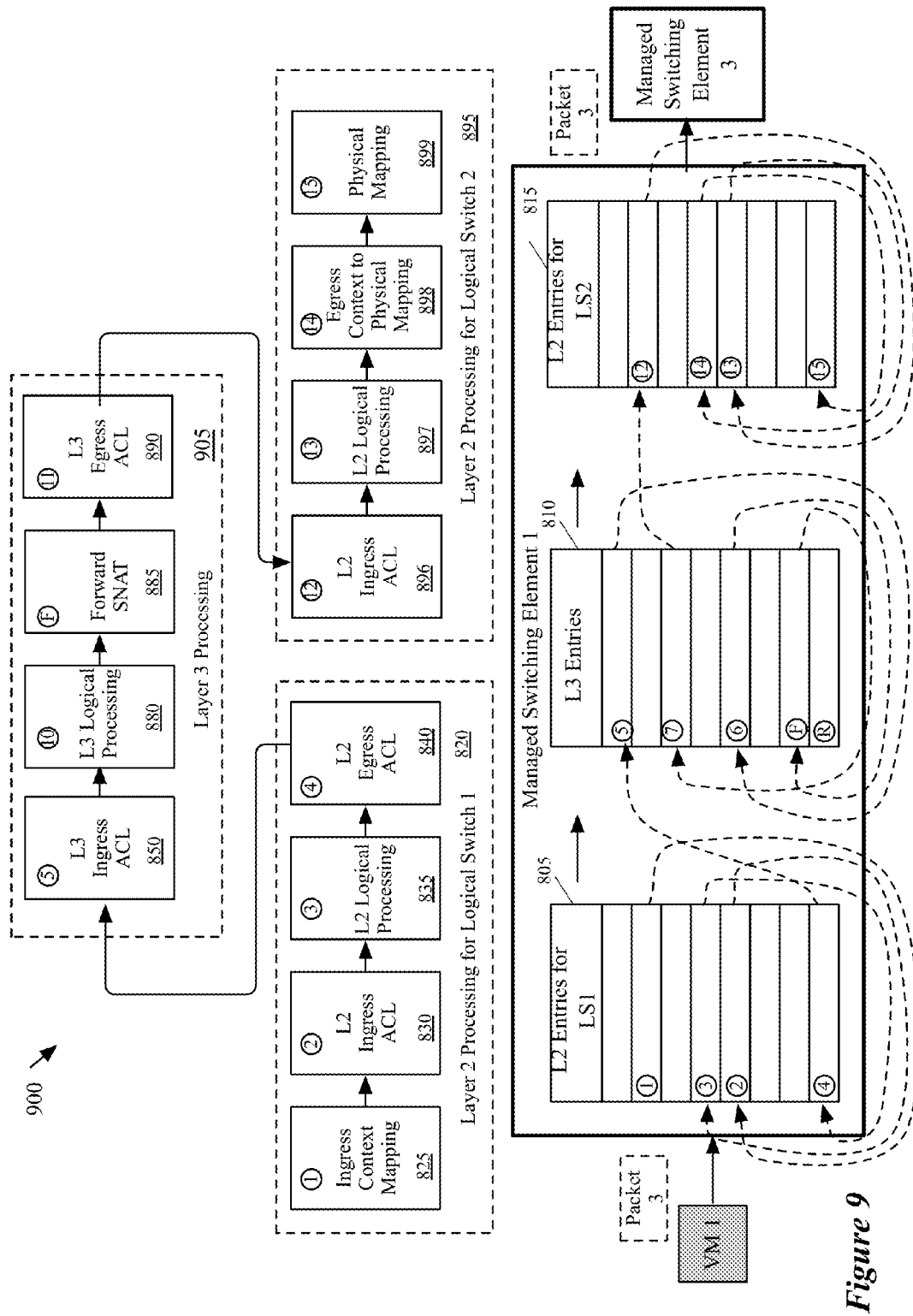
FIG. 9 conceptually illustrates an example operation of a MSE that is a first-hop MSE with respect to a data packet.

FIG. 9 conceptually illustrates an example operation of a MSE that is a first-hop MSE with respect to a data packet. Specifically, this figure illustrates an operation of the MSE 1 that processes a packet from VM 1 to VM 3. In this example, the packet is one of the packets that are being sent from VM 1 to VM 3 after the very first packet that has been sent from VM 1 to VM 3. This subsequent packet has the same source and destination IP addresses because the packet is being sent from the same source to the same destination as the first packet. The top half of this figure shows a processing pipeline 900 that the MSE performs on this packet. The processing pipeline 900 includes the L2 processing 820 for the logical switch 1, L3 processing 905 for the logical router 115, and the L2 processing 895 for the logical switch 2. The L3 processing 905 has the stages 850, 880, 885, and 890.

As shown in FIGS. 8 and 9, the difference between the processing of the very first packet (packet 1) and the processing of a subsequent packet (packet 3) by the MSE 1 is that the MSE 1 does not send the subsequent packet to the distributed middlebox instance 125. This is because after the stage 850 is performed according to the record 5, the MSE 1 goes with the record F rather than the record 6, which would have directed the MSE 1 to send the subsequent packet to the distributed middlebox instance. As described above by reference to FIG. 8, the record F (i.e., the forward flow entry created and installed by the distributed middlebox instance 125) has a higher priority level than the record 6 has. This shows that only the first packet for establishing a connection between the source and the destination needs to be sent to the distributed middlebox instance and thus makes it faster to process the subsequent packets being sent from the source to the destination.

C. Processing Response Packets

As mentioned above, in some embodiments, a particular MSE that is a first-hop with respect to a particular packet performs all or most of the logical processing that is to be performed on the particular packet in order for the particular packet to reach the packet's destination. In some such embodiments, the particular MSE also performs all or most of the logical processing that is to be performed on a response packet that is sent from the destination of the particular packet in response to receiving the particular packet. By having the particular MSE perform the logical processing on the response packet, some embodiments avoid having to share state information (e.g., mapping of the source IP address of the particular packet and the translated source IP address) between MSEs. That is, had the first-hop MSE to the response packet performed the logical operation on the response packet, that MSE would need the state information in order to restore the original source IP address and send the response packet back to the origin of the particular packet.

Figure 10:
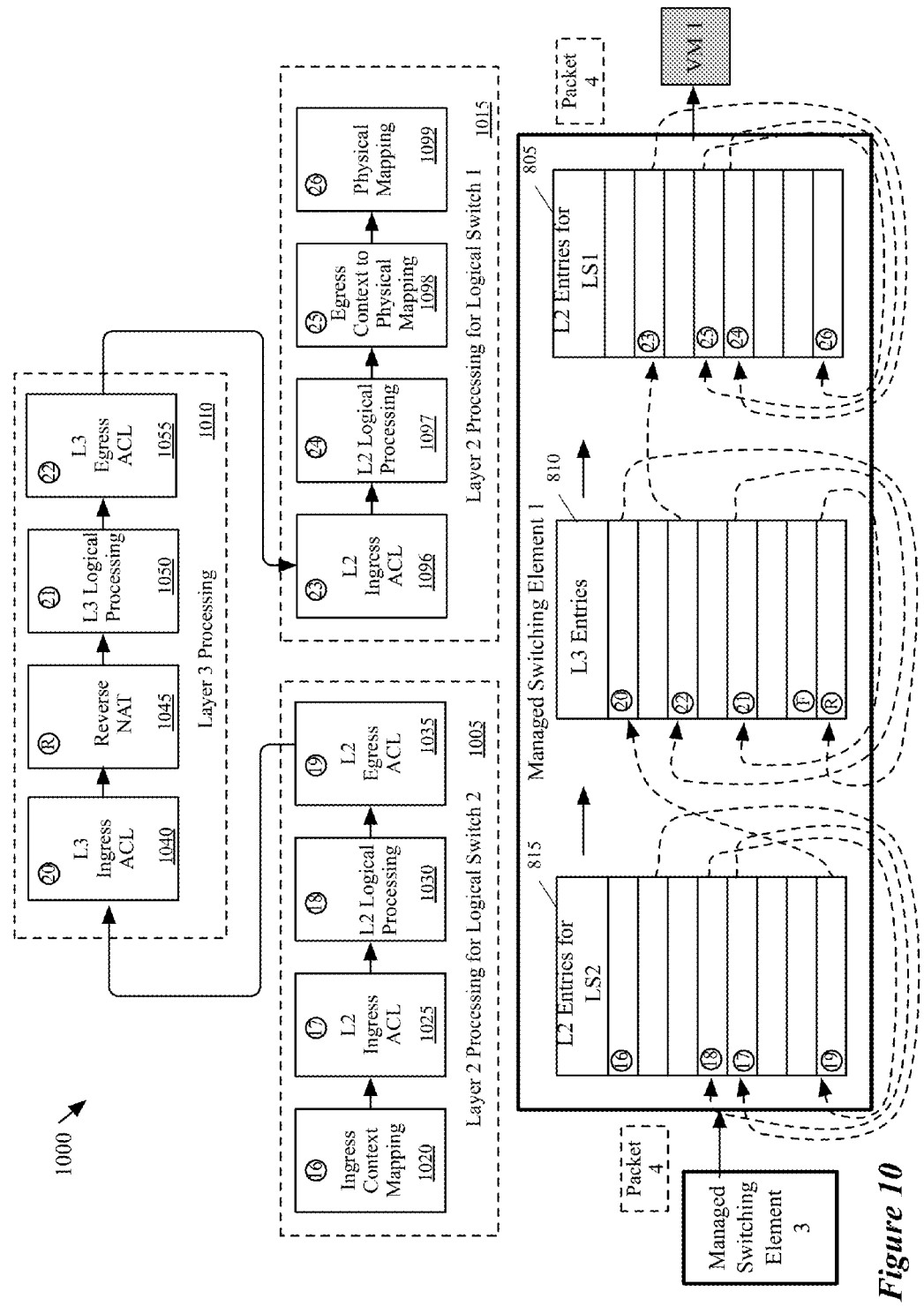
FIG. 10 conceptually illustrates an example operation of a MSE that is a first-hop MSE with respect to a particular packet and is a last-hop MSE with respect to a response packet that was sent in response to the particular packet.

FIG. 10 conceptually illustrates an example operation of a MSE that is a first-hop MSE with respect to a particular packet and is a last-hop MSE with respect to a response packet that was sent in response to the particular packet. Specifically, this figure illustrates an operation of the MSE 1 that processes a packet from VM 3 to VM 1. In this example, VM 3 has sent this packet to VM 1 in response to receiving a packet from VM 1. In other words, the response packet from VM 3 is part of data stream originating from VM 3 and flowing into VM 1 over a connection (e.g., a transport layer connection like a TCP connection). This figure also illustrates that the response packets are not sent to the distributed middlebox instance 125 for translating the destination IP addresses of the response packets into the IP address of VM 1. Instead, the MSE 1 performs that translation according to the reverse flow entry that is created and installed by the distributed middlebox instance 125 as described above by reference to FIG. 8.

The top half of FIG. 10 illustrates a processing pipeline 1000 that is performed by the MSE 1. The processing pipeline 1000 includes L2 processing 1005 for the logical switch 2, L3 processing 1010 for the logical router 115, and L2 processing 1015 for the logical switch 1, which have stages 1020-1035, stages 1040-1055, and stages 1096-1099, respectively. The bottom half of the figure illustrates the MSEs 1 and 3, and VM 1. As shown, the MSE 1 includes the tables 805, 810, and 815 for storing flow entries for the logical switch 1, the logical router 115, and the logical switch 2, respectively.

When the MSE 1 receives from the MSE 3 packet 4 that is originated from VM 3 through port A of the MSE, the MSE 1 performs the L2 processing 1005 to forward packet 4 from VM 3 to the logical router 115. The MSE 1 performs the L2 processing 1005 based on the flow entries indicated by encircled 16-19. Packet 4 has VM 3's IP address 10.0.2.1 as the source IP address and has the destination IP address of 11.0.1.1 because packet 4 is a response packet to a packet that has the source IP address of 11.0.1.1.

The MSE 1 then performs the L3 processing 1010 to route the packet out of the logical router 115 through port X of the logical router 115. Specifically, based on the logical context and/or other fields stored in packet 4's header, the MSE 1 identifies a flow entry indicated by an encircled 20 (referred to as "record 20") in the forwarding tables that implements the L3 ingress ACL of the stage 1040. In this example, the record 20 allows packet 4 to be further processed and, thus, specifies that packet 4 is to be further processed by the MSE 1. In addition, the record 20 specifies that the MSE 1 stores the logical context (i.e., packet 1 has been processed by the stage 1040) of packet 4 in the set of fields of packet 4's header.

The MSE 1 then identifies the reverse flow entry indicated by encircled R (referred to as "record R"). As mentioned above, the reverse flow entry specifies that the MSE 1 modifies a packet with a destination IP address of 11.0.1.1 by replacing the destination IP address of this packet with the IP address of the VM 1 (10.0.1.1).

The MSE 1 then identifies a flow entry indicated by an encircled 21 (referred to as "record 21") in the L3 entries 810 that implements L3 routing 1050 by specifying that packet 4 with its destination IP address (10.0.1.1) should exit out of port X of the logical router 115. Also, the record 21 (or another record in the routing table, not shown) indicates that the source MAC address for packet 4 is to be rewritten to the MAC address of port X of the logical router 115 (01:01:01:01:01:01).

The MSE 1 then identifies a flow entry indicated by an encircled 22 (referred to as "record 22") in the L3 entries 810 that implements L3 egress ACL by specifying that the MSE 1 allows the packet to exit out through port X of the logical router 115 based on the information (e.g., source IP address) in the header of packet 4. In addition, the record 22 specifies that the MSE 1 stores the logical context (i.e., packet 4 has been processed by the stage 1055 of the processing pipeline 1000) of packet 4 in the set of fields of packet 4's header.

The MSE 1 then performs the L2 processing 1015 for the logical switch 1 according to the flow entries indicated by encircled 23-26. The MSE will send packet 4 out of the logical switch 1 through port 1 of the logical switch. Because port C of the MSE 1 is mapped to port 1 of the logical switch, the MSE 1 will physical send out packet 1 to VM 1 through port C of the MSE 1.

D. Last-Hop Processing of the First and Subsequent Packets

In some embodiments, sanitizing packets is done at the last-hop MSE when the first-hop MSEs sending the packets to the last-hop MSEs do not assign unique identifiers to the packets. When the packets from different first-hop MSEs come into the same last-hop MSE without having been assigned unique identifiers, the last-hop MSE in some cases would not be able to send response packets to the right first-hop MSE because the incoming packets may have the same five-tuple (e.g., source IP address, destination IP address, transport protocol type, source port number, destination port number). Sanitizing packets includes adding a unique identifier to the packets in addition to the 5-tuples or modifying the 5-tuples of the packets (e.g., changing the source port number) to make the 5-tuples distinguishable.

Figure 11:
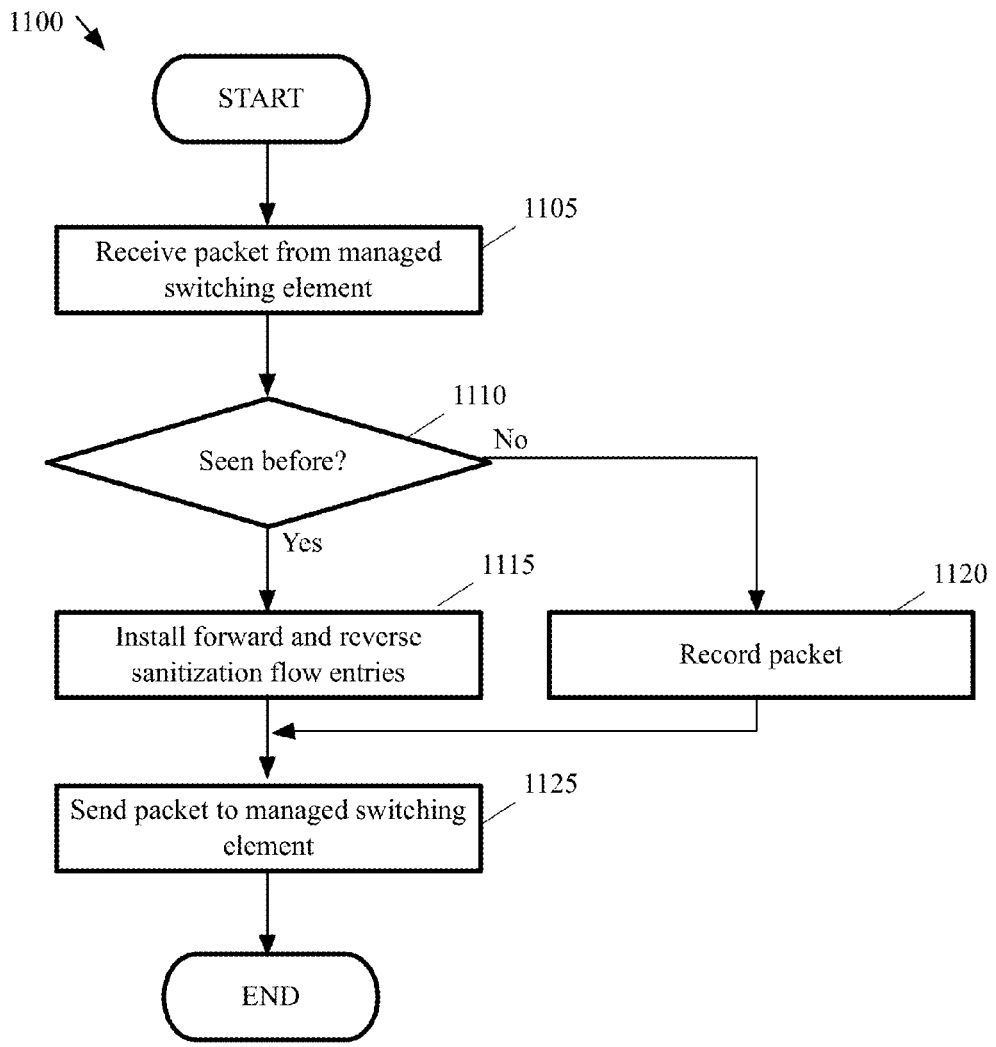
FIG. 11 conceptually illustrates a process that some embodiments perform to set up forward and reverse sanitization flow entries at a MSE that is a last-hop MSE.

FIG. 11 conceptually illustrates a process 1100 that some embodiments perform to set up forward and reverse sanitization flow entries at a MSE that is a last-hop MSE. A MSE is a last-hop MSE with respect to a particular packet when the MSE is directly interfacing the destination of the particular packet. For instance, for a packet that is sent from VM 1 to VM 3 as described above in FIG. 6, the MSE 3 is the last-hop with respect to the packet because the MSE 3 is directly interfacing VM 3, which is the destination of the packet.

In some embodiments, the process 1100 is performed by a distributed middlebox instance that runs in the same host in which a MSE runs. The MSE is the last-hop MSE with respect to the packets that the MSE sends to the distributed middlebox instance. The distributed middlebox instance of some embodiments also receives flow templates along with the packets. In these embodiments, the distributed middlebox provides the middlebox service by creating flow entries by filling in the flow templates with actual values and installing the created flow entries in the flow tables of the last-hop MSE. The distributed middlebox also sends the packets back to the last-hop MSE so that the packets are processed by the MSE based on the flow entries installed by the distributed middlebox instance.

The process 1100 begins by receiving (at 1105) a packet and several flow templates from a MSE that is a last-hop MSE with respect to this packet. That is, the MSE has received the packet from another MSE and not from a VM with which the receiving MSE directly interfaces. The packet has a five-tuple in the header of this packet. The process 1100 also receives the identification of the other MSE from which the receiving MSE received the packet.

Next, the process 1100 determines (at 1110) whether the process 1100 has previously received a packet that has the same five-tuple from a different MSE. The process 1100 in some embodiments maintains a look up table of five-tuples and the identifications of the MSE that has sent the packets with the five-tuples to the last-hop MSE. The process 1100 looks up this table to determine whether a packet with the same five-tuple as the received packet has been received from a MSE that is different from the MSE that has sent the currently received packet to the last-hop MSE.

When the process determines (at 1110) that the process 1100 has not seen a packet with the same five-tuple as that of the received packet from a different MSE, the process 1100 proceeds to 1120 to add the five-tuple and the MSE identification of the received packet in the look up table. The process 1100 then proceeds to 1125, which will be described further below.

When the process determines (at 1110) that the process 1100 has seen a packet with the same five-tuple as that of the received packet from a different MSE, the process 1100 proceeds to 1115 to create and install a forward sanitization flow entry and a reverse sanitization flow entry in the flow tables of the last-hop MSE. A forward sanitization flow entry is a flow entry that directs the last-hop MSE to modify the received packet's five-tuple to make the packet's five-tuple unique (e.g., by replacing the source port number with a new source port number). A reverse sanitization flow entry is a flow entry that directs the last-hop MSE to modify response packets that are sent from the received packet's destination to the source of the received packet. According to the reverse sanitization flow entry, the MSE un-does the sanitization performed based on the forward sanitization flow entry. That is, for instance, the last-hop MSE replaces the destination port number (i.e., the new source port number of the received packet) of the response packets with the original source port number of the received packet. The process 1100 records the new source port number so that the process 1100 does not reuse the same new source port number to sanitize other packets.

Next, the process 1100 then sends (at 1125) the received packet back to the last-hop MSE. The process 1100 then ends. The last-hop MSE will process the packet based on the flow entries, which will include the forward and reverse sanitization flow entries.

Figure 12:
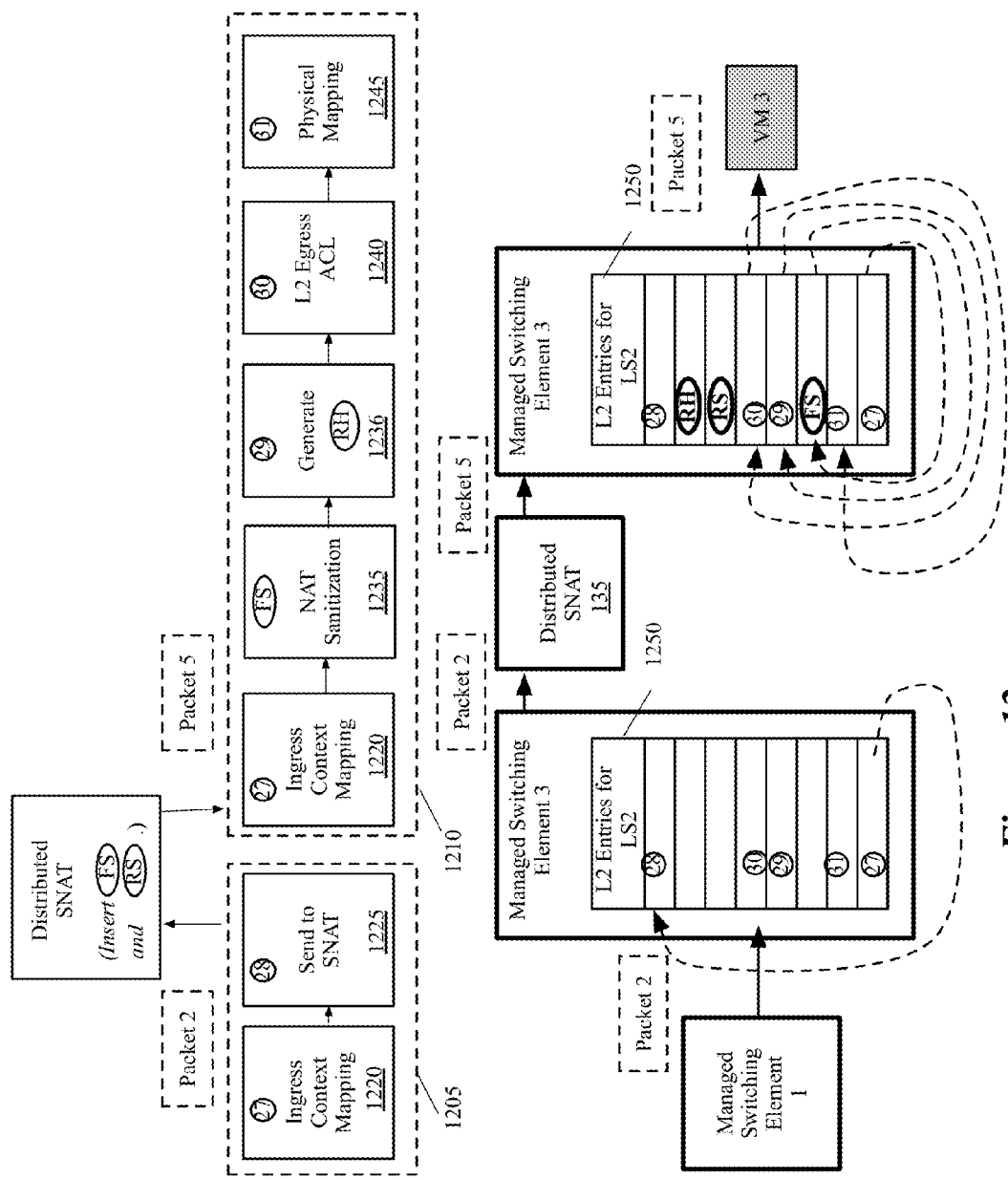
FIG. 12 conceptually illustrates example operations of a MSE that is a last-hop MSE with respect to packets.

FIG. 12 conceptually illustrates example operations of a MSE that is a last-hop MSE with respect to packets. That is, this MSE receives packets that are being sent to a destination with which this MSE is directly interfacing. Specifically, this figure illustrates operations of the MSE 3 that processes packets from VM 1 to VM 3. The MSE 3 processes packet 2 that is the first packet going to VM 3 from VM 1. Packet 2 is the packet that the MSE 1 has processed as described above by reference to FIG. 8.

The top side of the figure shows two processing pipelines 1205 and 1210 that are performed by the MSE 3. The processing pipeline 1205 includes stages 1220 and 1225. The processing pipeline 1210 includes stages 1220, 1235, 1236, 1240, and 1245. The bottom side of the figure shows the MSEs 1 and 3, and VM 3. As shown, the MSE 3 includes the table 1250 for storing flow entries for the logical switch 2.

When the MSE 3 receives from the MSE 1 packet 2 that is originated from VM 1 through port D of the MSE, the MSE 3 performs the processing pipeline 1205 to forward packet 2 to the distributed middlebox instance 135. The MSE 3 performs the processing pipeline 1205 based on the flow entries indicated by encircled 27 and 28. As described above by reference to FIG. 8, packet 2 has the source IP address of 11.0.1.1, which was translated from the IP address of VM 1 (10.0.1.1) and has the IP address of VM 3, 10.0.2.1 as the destination IP address. The packet 2 also has the MAC address of port Y of the logical router 115, 01:01:01:01:01:02, as a source MAC address and has the MAC address of VM 3 as the destination MAC address.

Based on the logical context stored in packet 2 header, the MSE 3 then identifies a flow entry indicated by an encircled 27 (referred to as "record 27") in the L2 entries table 1250 that implements the context mapping of the stage 1220. The record 27 identifies the packet 2's logical context based on the logical context that is stored in packet 2's header. The logical context specifies that packet 2 has been processed by the stage 897 of the processing pipeline 801, which was performed by the MSE 1. As such, the record 27 specifies that packet is to be further processed by the MSE 3 (e.g., by sending the packet to a dispatch port of the MSE 3).

The MSE 3 then identifies a flow entry indicated by encircled 28 (referred to as "record 28") in the table 1250 that implements the stage 1225. The record 28 specifies that packet 2 is to be sent to the distributed middlebox instance 135. The record 28 also specifies that several flow templates for generating forward and reverse sanitization flow entries are to be sent to the distributed middlebox instance. The record 28 also specifies that the MSE 3 is to send an identification of the MSE 1 to indicate that packet 2 came from the MSE 1. The managed switching element 3 of some embodiments also sends a slice identifier to the distributed middlebox instance 135 so that the slice of the distributed middlebox instance 135 for the user of the logical switches 1 and 2 and the logical router 115 processes packet 1.

Upon receiving packet 2 and the identification of the MSE 1 from the MSE 3, the distributed middlebox instance 135 identifies the five-tuple of packet 2 and determines whether the distributed middlebox instance has received a packet that has the same five-tuple from another MSE. In this example, the MSE 2 had sent a packet from VM 2 to VM 3 before. This packet had the same five-tuple as packet 2's because the distributed middlebox instance 130 running in host 2 for the MSE 2 and the distributed middlebox instance 125 running in host 1 for the MSE 1 are configured to implement the middlebox 120 and thus the distributed middlebox instance 130 translated the source IP address of the packet from VM 2 from the source IP address of VM 2 to 11.0.1.1.

In some embodiments, the distributed middlebox instance maintains a look up table of five-tuples and the identifications of the MSE that has sent the packets with the five-tuples to the last-hop MSE. In this example, the look up table of the distributed middlebox instance 135 has an entry for the packet from VM 2 and VM 3. The distributed middlebox instance 135 thus creates a forward sanitization flow entry that specifies that the MSE 3 modifies a packet that has the five tuple of packet 2 (e.g., source IP address: 11.0.1.1, destination IP address: 10.0.2.1, source port number: 1234, destination port number: 80, transport protocol: TCP) and the identification of the MSE 1 by replacing the source port number with a new source port number (e.g., 12340). The new source port number serves as a connection identifier because the new source port number makes the connection over which the packet is being sent unique.

The distributed middlebox instance 135 also creates a reverse sanitization flow entry that specifies that the MSE 3 modifies a packet (not shown), which is sent from VM 3 to VM 1 in response to receiving packet 2, by replacing the destination port number to the port number of VM 1 from which packet 2 came. This reverse sanitization is to restore the correct port number so that the response packet from VM 3 to VM 1 reaches the correct port of VM 1. In this example, the flow entry indicated by encircled RS ("the record RS") specifies that the MSE 3 modifies a packet, which has a five-tuple of a packet from VM 3 to VM 1 in response to packet 5 (e.g., source IP address: 10.0.2.1, destination IP address: 11.0.1.1, source port number: 80, destination port number: 12340, transport protocol: TCP), by replacing the destination port number with the source port number (e.g., 1234) of packet 2 before being sanitized.

The distributed middlebox instance 135 installs the created flow entries and sends packet 2 back to the MSE 3. In some embodiments, the MSE 3 treats the packet returned from the distributed middlebox instance 135 as a new packet to route. Thus, this new packet is referred to as packet 5 in this example. As shown, the forward and reverse sanitization flow entries are installed (e.g., placed) in the table 1250 indicated by encircled FS and RS, respectively.

In some embodiments, the distributed middlebox instance may keep separate slices for generating forward and reverse flow entries and generating sanitization flow entries. That is, the distributed middlebox instance has one slice for the packets for which the distributed middlebox instance provides the SNAT service and has another slice for the packets for which the distributed middlebox instance provides sanitization even though all these packets belong to the same logical domain of a single user.

Upon receiving packet 5, the MSE 3 performs the processing pipeline 1210 on packet 5 based on the table 1250. In this example, because packet 5 is still the same as packet 2, packet 5 has the same five-tuple with the source port number 1234. The MSE 3 identifies a flow entry indicated by an encircled 27 (referred to as "record 27") in the forwarding table 1250 that implements the context mapping of the stage 1220, which is described above. The record 27 also specifies packet 5 is to be further processed by the MSE 1 (e.g., by sending packet 5 to a dispatch port).

The MSE 3 identifies a flow entry indicated by an encircled FS (referred to as "record FS") in the table 1250. The record FS is the forward sanitization flow entry that the distributed middlebox instance 135 has created and installed in the table 1250. Packet 5 meets the condition specified in the record FS as well as the condition specified in the record 28 because packet 5's five-tuple is specified as a condition in the record FS and in the record 28. In some embodiments, the record FS that is created by the distributed middlebox instance has a higher priority level than that of the record 28, which directs the MSE 3 to send the packet to the distributed middlebox instance 135. In addition, the record FS specifies that the MSE 3 stores the logical context (i.e., packet 5 has been processed by the stage 1230 of the processing pipeline 1205) of packet 5 in the set of fields of packet 5's header.

The MSE 3 then identifies a flow entry indicated by an encircled 29 (referred to as "record 29") in the L2 entries 1250 that implements generating a reverse hint flow entry of the stage 1236. In some embodiments, the last-hop MSE creates and installs a reverse hint. A reverse hint in some embodiments is a flow entry that directs the MSE, which is the last-hop MSE with respect to a particular packet, to send a response packet to the origin of the particular packet without performing logical processing on the response packet. A reverse hint is set up in order to allow the first-hop MSE with respect to the particular packet to process all or most of the logical processing in some embodiments. As shown, the MSE has installed a reverse hint flow entry indicated by encircled RH (referred to as "record RH"). In this example, the record RH specifies that the MSE 3 sends a packet, which has a five-tuple of a packet from VM 3 to VM 1 in response to receiving the sanitized packet 5 (e.g., source IP address: 10.0.2.1, destination IP address: 11.0.1.1, source port number: 80, destination port number: 1234, transport protocol: TCP) to the MSE 1.

Next, the MSE 3 identifies, based on the logical context and/or other fields stored in packet 5's header, a flow entry indicated by an encircled 30 (referred to as "record 30") in the forwarding tables that implements the egress ACL of the stage 1240. In this example, the record 30 allows packet 5 to be further processed (e.g., packet 5 can get out of the logical switch 2 through port 5 of the logical switch 2) and, thus, specifies packet 5 is to be further processed by the MSE 3. In addition, the record 30 specifies that the MSE 3 stores the logical context (i.e., packet 5 has been processed by the stage 1240 of the processing pipeline 1210) of packet 5 in the set of fields of packet 5's header.

Based on the logical context and/or other fields stored in packet 5's header, the MSE 3 then identifies a flow entry indicated by an encircled 31 (referred to as "record 31") in the table 1250 that implements the physical mapping of the stage 1245. The record 31 specifies port F of the MSE 3 as a port through which packet 5 is to be sent in order for packet 5 to reach VM 3. In addition, the record 31 specifies that the MSE 3 removes the logical context of packet 5 from the set of fields of packet 5's header. The MSE 3 sends packet 5 to VM 3.

Figure 13:
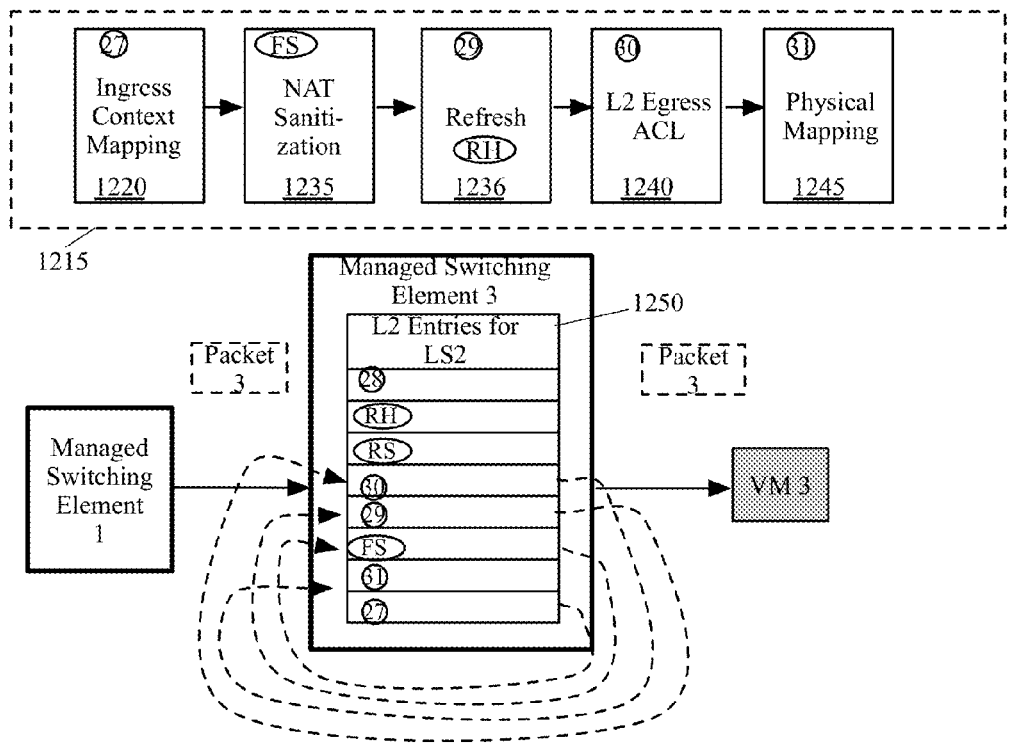
FIG. 13 conceptually illustrates example operations of a MSE that is a last-hop MSE with respect to packets.

FIG. 13 conceptually illustrates example operations of a MSE that is a last-hop MSE with respect to packets. Specifically, this figure illustrates operations of the MSE 3 that processes a packet from VM 1 to VM 3. In this example, the MSE processes packet 3 that is one of the packets going to VM 3 from VM 1 after the first packet has reached VM 3. Packet 3 is the packet that the MSE 1 has processed as described above by reference to FIG. 9. As shown, the MSE processes packet 3 that is one of the packets going to VM 3 from VM 1 after the first packet has reached VM 3. Packet 3 is the packet that the MSE 1 has processed as described above by reference to FIG. 9.

The top half of the figure shows a processing pipeline 1215 that the MSE 3 performs on packet 3. The processing pipeline 1215 includes the stages 1220, 1235, 1236, 1240, and 1245, which are described above. As shown in FIGS. 12 and 13, the difference between the processing of the very first packet (packet 2) and the processing a subsequent packet (packet 3) by the MSE 3 (i.e., the last-hop MSE with respect to packets 2 and 3) is that the MSE 3 does not send the subsequent packet to the distributed middlebox instance 135. This is because after the stage 1220 is performed according to the record 27, the MSE 3 goes with the record FS rather than the record 28, which would have directed the MSE 3 to send the subsequent packet to the distributed middlebox instance 135. As described above, the record FS (i.e., the forward sanitization flow entry created and installed by the distributed middlebox instance 135) has a higher priority level than the record 28's priority level. This shows that only the first packet for establishing a connection between the source and the destination needs to be sent to the distributed middlebox instance and thus makes it faster to process the subsequent packets being sent from the source to the destination. Also, the MSE 3 regenerates or refreshes the record RH by performing the stage 1236 for packet 3.

E. Last-Hop Processing of Response Packet

Figure 14:
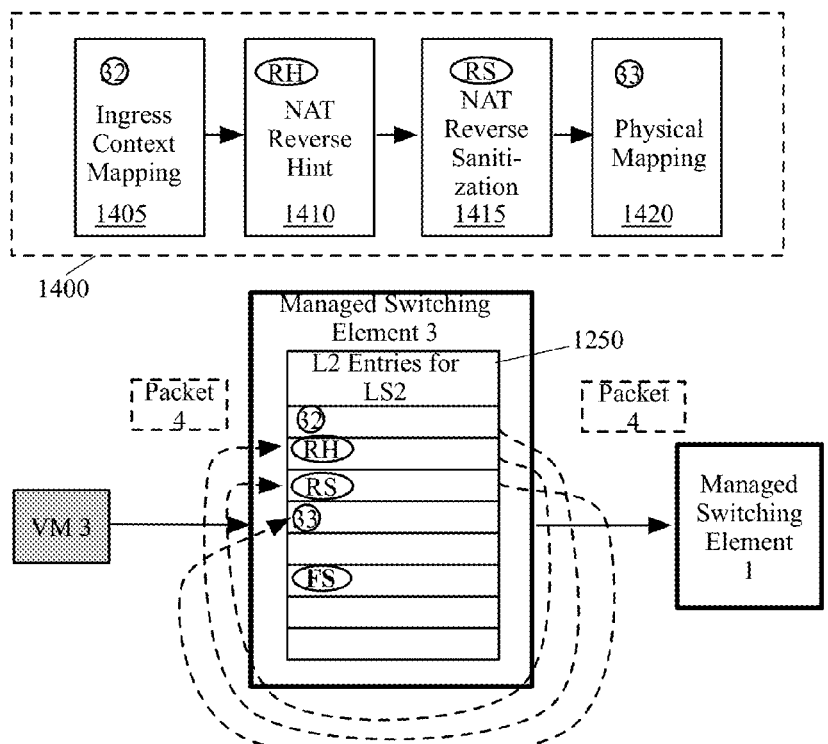
FIG. 14 conceptually illustrates an example operation of a MSE that is a last-hop MSE with respect to a particular packet and is a first-hop MSE with respect to a response packet that is sent in response to the particular packet.

FIG. 14 conceptually illustrates an example operation of a MSE that is a last-hop MSE with respect to a particular packet and is a first-hop MSE with respect to a response packet that is sent in response to the particular packet. Specifically, this figure illustrates an operation of the MSE 3 that processes a packet from VM 3 to VM 1. In this example, VM 3 sends this packet to VM 1 in response to receiving a packet from VM 1.

This figure also illustrates that the response packets are not sent to the distributed middlebox instance 135 for translating the destination IP addresses of the response packets into the IP address of VM 1. Instead, the MSE 3 processes the response packets according to the reverse hint flow entry and the sanitization flow entry that are created and installed by the distributed middlebox instance 135 as described above by reference to FIG. 12.

The top half of FIG. 14 illustrates a processing pipeline 1400 that is performed by the MSE 3. The processing pipeline 1400 includes stages 1405-1420. The bottom half of the figure illustrates the MSEs 3 and 1, and VM 3. As shown, the MSE 3 includes the table 1250 for storing flow entries.

When the MSE 3 receives packet 4 from VM 3 through port F of the MSE, the MSE 3 performs the L2 processing 1400 to forward packet 4 from VM 3 to the logical router 115. The MSE 3 performs the processing pipeline 1400 based on the flow entries indicated by encircled 32, RH, RS, and 33. Packet 4 has a destination port number that is the destination port number of the sanitized packet 3 (e.g., 12340).

The MSE 3 identifies a flow entry indicated by an encircled 32 (referred to as "record 32") in the forwarding table 1250 that implements the context mapping of the stage 1405. The record 32 identifies packet 4's logical context based on the ingress port, which is port F of the MSE 3 through which packet 1 is received from VM 3. In addition, the record 32 specifies that the MSE 3 stores the logical context of packet 4 in a set of fields of packet 4's header. The record 32 also specifies packet 4 is to be further processed by the forwarding tables The MSE 3 then identifies the reverse hint flow entry, the record RH. As mentioned above, the record RH specifies that the MSE 3 sends a packet, which has a five-tuple of a packet from VM 3 to VM 1 in response to receiving the sanitized packet 5 (e.g., source IP address: 10.0.2.1, destination IP address: 11.0.1.1, source port number: 80, destination port number: 1234, transport protocol: TCP) to the MSE 1.

The MSE 3 then identifies the reverse sanitization flow entry, the record RS, which is created and installed by the distributed middlebox instance 135. As mentioned above, the record RS specifies that the MSE 3 modifies a packet, which has a five-tuple of a packet from VM 3 to VM 1 in response to packet 5 (e.g., source IP address: 10.0.2.1, destination IP address: 11.0.1.1, source port number: 80, destination port number: 12340, transport protocol: TCP), by replacing the destination port number with the source port number (e.g., 1234) of packet 2 before being sanitized. The MSE modifies packet 4 accordingly.

Based on the logical context and/or other fields stored in packet 4's header, the MSE 3 then identifies a flow entry indicated by an encircled 33 (referred to as "record 33") in the table 1250 that implements the physical mapping of the stage 1420. The record 33 specifies port D of the MSE 3 as a port through which packet 4 is to be sent in order for packet 4 to reach VM 1. The MSE 3 sends packet 4 to the MSE 1 through port D accordingly.

III. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 15:
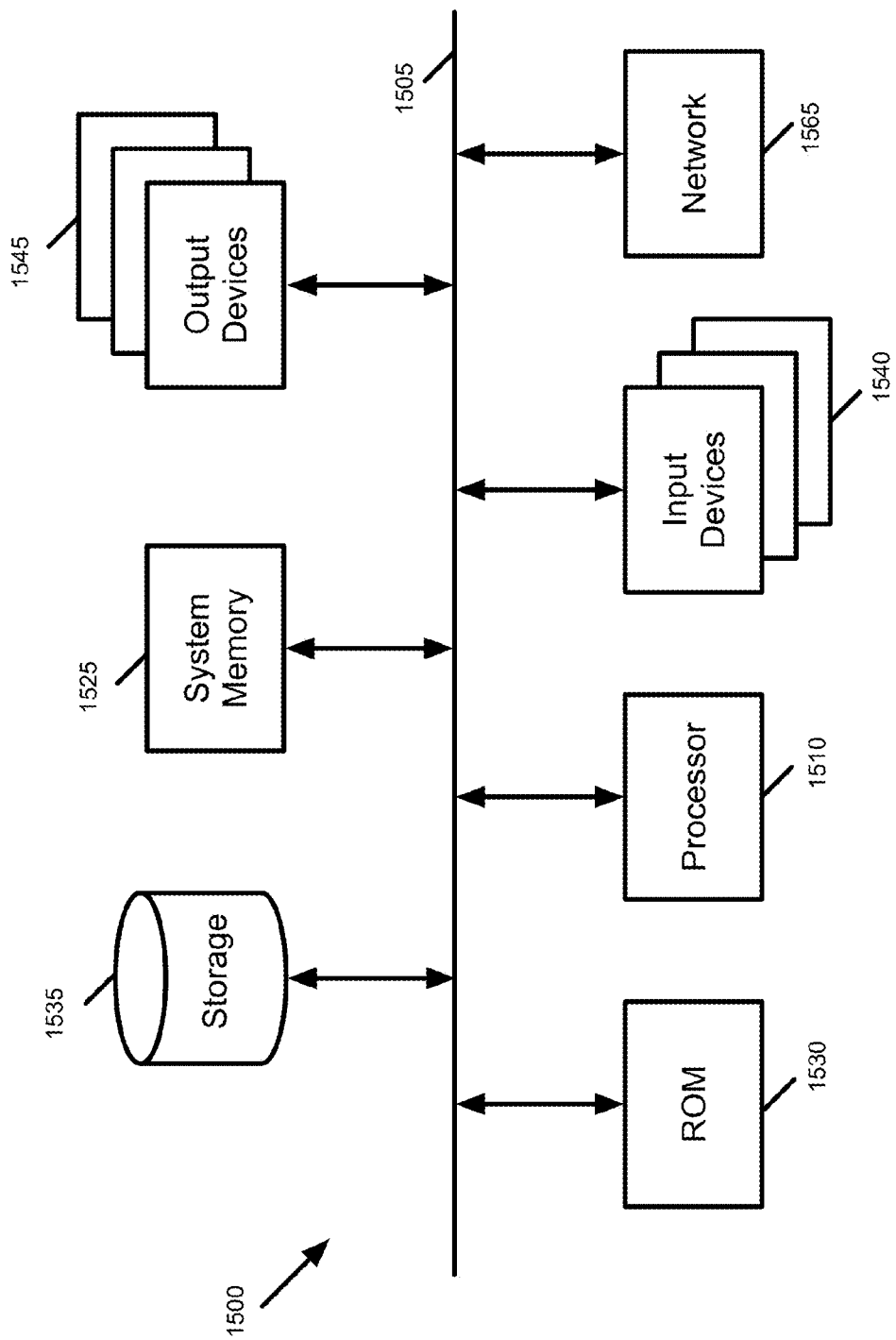
FIG. 15 conceptually illustrates an electronic system with which some embodiments of the invention are implemented.

FIG. 15 conceptually illustrates an electronic system 1500 with which some embodiments of the invention are implemented. The electronic system 1500 may be a computer, server, dedicated switch, phone, or any other sort of electronic device. Such an electronic system includes various types of computer readable media and interfaces for various other types of computer readable media. Electronic system 1500 includes a bus 1505, processing unit(s) 1510, a system memory 1525, a read-only memory 1530, a permanent storage device 1535, input devices 1540, and output devices 1545.

The bus 1505 collectively represents all system, peripheral, and chipset buses that communicatively connect the numerous internal devices of the electronic system 1500. For instance, the bus 1505 communicatively connects the processing unit(s) 1510 with the read-only memory 1530, the system memory 1525, and the permanent storage device 1535.

From these various memory units, the processing unit(s) 1510 retrieve instructions to execute and data to process in order to execute the processes of the invention. The processing unit(s) may be a single processor or a multi-core processor in different embodiments.

The read-only-memory (ROM) 1530 stores static data and instructions that are needed by the processing unit(s) 1510 and other modules of the electronic system. The permanent storage device 1535, on the other hand, is a read-and-write memory device. This device is a non-volatile memory unit that stores instructions and data even when the electronic system 1500 is off. Some embodiments of the invention use a mass-storage device (such as a magnetic or optical disk and its corresponding disk drive) as the permanent storage device 1535.

Other embodiments use a removable storage device (such as a floppy disk, flash drive, or ZIP® disk, and its corresponding disk drive) as the permanent storage device. Like the permanent storage device 1535, the system memory 1525 is a read-and-write memory device. However, unlike storage device 1535, the system memory is a volatile read-and-write memory, such a random access memory. The system memory stores some of the instructions and data that the processor needs at runtime. In some embodiments, the invention's processes are stored in the system memory 1525, the permanent storage device 1535, and/or the read-only memory 1530. From these various memory units, the processing unit(s) 1510 retrieve instructions to execute and data to process in order to execute the processes of some embodiments.

The bus 1505 also connects to the input and output devices 1540 and 1545. The input devices enable the user to communicate information and select commands to the electronic system. The input devices 1540 include alphanumeric keyboards and pointing devices (also called "cursor control devices"). The output devices 1545 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 15, bus 1505 also couples electronic system 1500 to a network 1565 through a network adapter (not shown). In this manner, the computer can be a part of a network of computers (such as a local area network ("LAN"), a wide area network ("WAN"), or an Intranet, or a network of networks, such as the Internet. Any or all components of electronic system 1500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 7 and 11) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A non-transitory machine readable medium of a controller of a network control system for configuring a logical middlebox in a plurality of hosts, the network control system comprising a plurality of controllers, the non-transitory machine readable medium storing sets of instructions for:
   receiving configuration data for configuring, in each host of the plurality of hosts, a middlebox instance to provide a source network address translation (SNAT) service to a virtual machine operating in the host;
   identifying a set of additional controllers of the network control system that manage the plurality of middlebox instances for implementing the configuration data; and
   sending the configuration data to the identified set of additional controllers for the additional controllers to subsequently distribute the configuration data to the plurality of middlebox instances.

2. The non-transitory machine readable medium of claim 1, wherein the controller is a logical controller and the additional controllers are physical controllers.

3. The non-transitory machine readable medium of claim 1, wherein the network control system is for generating physical control plane data for managing a set of managed forwarding elements that implements forwarding operations associated with a first logical datapath set, wherein the controller further comprises a set of instructions for converting logical control plane data for the first logical datapath set to physical control plane data.

4. The non-transitory machine readable medium of claim 3, wherein the controller is a master controller for the first logical datapath set, wherein each of the additional controllers is a master controller for a set of managed forwarding elements that operate in the plurality of hosts to implement the first logical datapath set.

5. The non-transitory machine readable medium of claim 1, wherein the configuration data comprise at least one mapping of a pair of addresses.

6. The non-transitory machine readable medium of claim 1, wherein the configuration data comprise a set of connection identifiers, wherein the middlebox instance provides the SNAT service to the virtual machine operating in the same host by assigning connection identifiers in the set of connection identifiers to packets the middlebox instance receives from the virtual machine.

7. The non-transitory machine readable medium of claim 6, wherein connection identifiers in the set of connection identifiers are assigned to packets in order for managed switching elements, operating in other hosts that receive the packets, to use the connection identifiers to send responses to the correct sources of the packets.

8. The non-transitory machine readable medium of claim 6, wherein the middlebox instance is configured to associate a connection identifier in the set of connection identifiers with a first packet originating from the virtual machine operating in the host.

9. The non-transitory machine readable medium of claim 8, wherein the middlebox instance associates the connection identifier with the first packet by replacing a source port number of the first packet with the connection identifier.

10. The non-transitory machine readable medium of claim 6, wherein the set of connection identifiers is recorded as no longer available to prevent other middlebox instances from assigning connection identifiers in the set of connection identifiers to packets the other middlebox instances receive.

11. For a controller of network control system comprising a plurality of controllers, a method for configuring a logical middlebox in a plurality of hosts, the method comprising:
receiving configuration data for configuring, in each host of the plurality of hosts, a middlebox instance to provide a source network address translation (SNAT) service to a virtual machine operating in the host;
identifying a set of additional controllers of the network control system that manage the plurality of middlebox instances for implementing the configuration data; and
sending the configuration data to the identified set of additional controllers for the additional controllers to subsequently distribute the configuration data to the plurality of middlebox instances.

12. The method of claim 11, wherein the controller is a logical controller and the additional controllers are physical controllers.

13. The method of claim 11, wherein the network control system is for generating physical control plane data for managing a set of managed forwarding elements that implements forwarding operations associated with a first logical datapath set, wherein the controller further comprises a set of instructions for converting logical control plane data for the first logical datapath set to physical control plane data.

14. The method of claim 13, wherein the controller is a master controller for the first logical datapath set, wherein each of the additional controllers is a master controller for a set of managed forwarding elements that operate in the plurality of hosts to implement the first logical datapath set.

15. The method of claim 11, wherein the configuration data comprise at least one mapping of a pair of addresses.

16. The method of claim 11, wherein the configuration data comprises a set of connection identifiers, wherein the middlebox instance provides the SNAT service to the virtual machine operating in the same host by assigning connection identifiers in the set of connection identifiers to packets the middlebox instance receives from the virtual machine.

17. The method of claim 16, wherein connection identifiers in the set of connection identifiers are assigned to packets in order for managed switching elements, operating in other hosts that receive the packets, to use the connection identifiers to send responses to the correct sources of the packets.

18. The method of claim 16, wherein the middlebox instance is configured to associate a connection identifier in the set of connection identifiers with a first packet originating from the virtual machine operating in the host.

19. The method of claim 18, wherein the middlebox instance associates the connection identifier with the first packet by replacing a source port number of the first packet with the connection identifier.

20. The method of claim 16, wherein the set of connection identifiers is recorded as no longer available to prevent other middlebox instances from assigning connection identifiers in the set of connection identifiers to packets the other middlebox instances receive.

* * * * *